(12) United States Patent
Chomal et al.

(10) Patent No.: US 9,356,650 B2
(45) Date of Patent: May 31, 2016

(54) CIRCUITS, DEVICES, AND PROCESSES FOR IMPROVED POSITIONING SATELLITE RECEPTION AND OTHER SPREAD SPECTRUM RECEPTION

(71) Applicant: Texas Instruments Incorporated, Dallas, TX (US)

(72) Inventors: Sunil Chomal, Karnataka (IN); Karthik Ramasubramanian, Karnataka (IN); Jawaharlal Tangudu, Karnataka (IN); Hemanth Mullur, Karnataka (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/561,407

(22) Filed: Dec. 5, 2014

(65) Prior Publication Data

US 2015/0085901 A1   Mar. 26, 2015

Related U.S. Application Data

(62) Division of application No. 13/481,439, filed on May 25, 2012, now Pat. No. 8,934,522.

(30) Foreign Application Priority Data

Nov. 30, 2011   (IN) ............... 4142/CHE/2011

(51) Int. Cl.
*H04B 1/709* (2011.01)
*H04B 1/7075* (2011.01)

(52) U.S. Cl.
CPC .............. *H04B 1/709* (2013.01); *H04B 1/7075* (2013.01); *H04B 2201/70715* (2013.01)

(58) Field of Classification Search
USPC .................. 375/150, 130, 142, 143, 152
See application file for complete search history.

(56) References Cited

U.S. PATENT DOCUMENTS

| | | | |
|---|---|---|---|
| 6,952,440 B1 | 10/2005 | Underbrink | |
| 2004/0076223 A1* | 4/2004 | Krasner et al. | 375/143 |
| 2008/0084954 A1* | 4/2008 | Chen et al. | 375/354 |
| 2009/0213006 A1 | 8/2009 | Nayyar et al. | |
| 2009/0219202 A1 | 9/2009 | Pon | |
| 2009/0224973 A1 | 9/2009 | Nayyar | |

FOREIGN PATENT DOCUMENTS

CN   101317338 A   12/2008

OTHER PUBLICATIONS

Search Report (Translation).

* cited by examiner

*Primary Examiner* — Kabir A Timory
(74) *Attorney, Agent, or Firm* — John R. Pessetto; Frank D. Cimino

(57) ABSTRACT

An integrated circuit for facilitating spread spectrum reception of data having a data bit period includes an hypothesis search circuit (120, 210, 220) operable to correlate a pseudo-random code with a signal input based on a received signal to produce correlation results, and a processor circuit (320) operable to coherently integrate the correlation results over plural sample windows (PreD1, PreD2) staggered relative to each other in the coherent integration interval and to non-coherently combine the coherently integrated results corresponding to the plural sample windows (PreD1, PreD2) to produce a received signal output, whereby enhancing performance. Other circuits, receivers and processes are also disclosed.

13 Claims, 15 Drawing Sheets

CIRCUITS, DEVICES, AND PROCESSES FOR IMPROVED POSITIONING SATELLITE RECEPTION AND OTHER SPREAD SPECTRUM RECEPTION

CROSS-REFERENCE TO RELATED APPLICATIONS

This application is a divisional of prior application Ser. No. 13/481,439, filed May 25, 2012, currently pending;

And this application is related to India Patent Application "Circuits, Devices, and Processes for Improved Positioning Satellite Acquisition Sensitivity in Asynchronous Networks," 4142/CHE/2011 filed Nov. 30, 2011, for which priority is claimed under the Paris Convention and all other applicable law, and which is incorporated herein by reference in its entirety.

US Patent Application Publication 20120319899, dated Dec. 20, 2012 "Dynamic Switching to Bit-Synchronous Integration to Improve GPS Signal Detection," Ser. No. 13/161,692 filed Jun. 16, 2011, is hereby incorporated by reference herein in its entirety.

US Patent Application Publication 20120026039, dated Feb. 2, 2012, "A Single RF Receiver Chain Architecture for GPS, Galileo and Glonass Navigation Systems, and Other Circuits, Systems and Processes," is hereby incorporated by reference herein in its entirety.

US Patent Application Publication 20110103432, dated May 5, 2011, "Enhanced Cross Correlation Detection or Mitigation Circuits, Processes, Devices, Receivers and Systems," is hereby incorporated by reference herein in its entirety.

US Patent Application Publication 20090168843 dated Jul. 2, 2009, "Power-Saving Receiver Circuits, Systems and Processes," is hereby incorporated by reference herein in its entirety.

US Patent Application Publication 20090054075 dated Feb. 26, 2009, "Satellite (GPS) Assisted Clock Apparatus, Circuits, Systems and Processes for Cellular Terminals on Asynchronous Networks," is hereby incorporated by reference herein in its entirety.

US Patent Application Publication 20120136573 dated May 31, 2012, "Attitude Estimation for Pedestrian Navigation Using Low Cost MEMS Accelerometer in Mobile Applications, and Processing Methods, Apparatus and Systems," Ser. No. 13/301,913 filed Nov. 22, 2011, is hereby incorporated by reference herein in its entirety.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in a governmental patent office to the extent they have a non-copyright right to do so, but otherwise reserves all copyright rights whatsoever.

BACKGROUND OF THE INVENTION

GPS (Global Positioning System) is an earth-satellite-based electronic system for enabling GPS receivers in ships, aircraft, land vehicles and land stations to determine their geographic and spatial position such as in latitude, longitude, and altitude. Discussion of GPS herein is without limitation to other analogous electronic systems as well as applicable receiver circuits in a variety of telecommunication systems. "GNSS" herein refers to any navigation satellite system. A GNSS receiver computes the user position by triangulation or trilateration using measured distances to enough satellite vehicles (earth satellites) SVi to achieve a position fix. "Assisted GNSS" assists the computations by information obtained from a terrestrial communications network.

Glonass support to receive Glonass (Russian) satellites is also fast becoming an additional key requirement for GPS receivers in the USA and much of the rest of the world. In FIG. 1, users care about sensitivity performance of satellite positioning receivers because such sensitivity enables the receiver to work indoors more often and improves the user experience outdoors and indoors. For receiving GNSS and assisted GNSS, every 0.5 dB of receiver sensitivity is valuable, e.g. desirably enhancing performance margin for industry tests like those of the group 3GPP.

It would be desirable to even more accurately, reliably, rapidly, conveniently and economically search for, acquire, and track received signals and maintain accurate time, position, velocity, and/or acceleration estimation in a communication device having a satellite positioning receiver (SPR) or other receiver and its clock source.

In FIG. 2 for a typical satellite acquisition strategy, a terrestrial receiver 100 has an RF front end 110, and baseband signal processing BSP/Correlators 120 section accumulates correlation results across several milliseconds for satellite signal detection. Accumulation of correlation results is done using a combination of coherent integration (a.k.a 'pre-detection' PreD) and non-coherent integration (a.k.a 'post-detection' PostD) in an accumulate and dump (AD) section 130 followed by final processing and navigation applications 140. Such a process of correlation and accumulation is called a "dwell" and has a dwell time $T_D$ where $T_D$=PreD*PostD.

Coherent integration boosts signal-to-noise ratio SNR by adding (accumulating or integrating) the 1 ms repetitions of the satellite signal coherently. The signal is e.g. binary BPSK (binary phase shift keying) modulated with +/−1 modulation, meaning +/−180 degrees phase shift depending on each bit. Coherent accumulation adds the received signal waveform of each repetition (e.g., each 1 ms time window) arithmetically over a number of repetitions within a given bit interval, while noise being statistical accumulates in rms (root-mean-square) value more slowly as the square root of the number of repetitions so that SNR is boosted.

Non-coherent integration squares the signal ($S^2$=S(t)×S(t)) to remove the BPSK modulation (i.e., the square of +/−1 modulation is always +1). This way, non-coherent integration can be performed over many bit intervals to increase the overall gain. However, non-coherent integration also squares the noise N(t) along with the signal S(t). Heuristically, consider a summation over time of squaring combined signal and noise $(S(t)+N(t))^2=S^2(t)+2S(t)N(t)+N^2(t)$. The summing basically builds up $S^2(t)+N^2(t)$ more than the cross-product term. So SNR is generally not increased as much by the non-coherent integration as by coherent integration. Strictly speaking, even after squaring, the squared-signal $S^2(t)$ linearly increases with integration whereas standard deviation of squared-noise $N^2(t)$ increases more slowly. The squaring removes phase information, which leads to loss of SNR. The relatively-poorer noise performance of non-coherent integration compared to coherent integration is called squaring loss.

(Analogous remarks directed specifically to an absolute value (abs) approach to noncoherent integration could also be stated here but are omitted, because like squaring, abs operates on only same-signed sample values.)

For a given dwell time $T_D$, longer coherent integration time PreD means more SNR enhancement and fewer terms (i.e. equal in number to PostD ratio of $T_D$/PreD) in the non-coherent integration or accumulation. For example, a receiver can use a dwell with PreD=1 ms and PostD=200 to detect signals down to −140 dBm. Receivers can use a dwell with PreD=20 ms and PostD=800 to detect signals down to or as low as −160 dBm.

Longer coherent integration time (PreD, e.g. 20 ms) reduces squaring loss associated with non-coherent operation and hence achieves better receiver sensitivity.

GPS and other GNSS acquisition sensitivity is limited by the longest coherent integration period (PreD) possible for a given integration time. In GPS signal structure, each bit duration is 20 ms. See FIG. 3A, and magnified details in FIGS. 3B and 3C.

High-sensitivity dwells are usually done using the longest coherent integration period (PreD) possible. However, the bit-edge alignment is unknown at the beginning. See FIG. 3A. Therefore, whenever the coherent integration straddles a bit boundary, sensitivity is likely to suffer from bit-edge transition-related loss. This is because coherent accumulation of the waveform may result in some waveform subtraction near such a bit boundary if the BPSK modulation transitions from +1 to −1, or from −1 to +1, there. In GPS, one possible technique is to use a PreD of 19 ms when bit edge is not known. The number 19 is co-prime with the number 20 (i.e., 19 and 20 are relatively prime), which thereby positions a 19 ms window repeatedly across a long dwell so that the 19 ms window variously straddles 20 ms bit widths or occasionally lies in one of them. Therefore the loss due to integrations across bit-edge transitions over a long dwell approaches an average loss value, which can be computed or estimated predictively from the respective losses of each of many positions of the 19 ms window across the dwell.

For GPS, the expected or average de-sense due to PreD of 19 ms is around 1.6 dB as compared to an ideal bit-aligned PreD of 20 ms. (De-sense refers to a number of dB of diminished sensitivity relative to the sensitivity which would be enjoyed under an ideal receiver processing condition or some receiver processing condition used as a reference.) A first problem accordingly confronts the art, namely how can the GPS or other GNSS acquisition sensitivity be improved further when the bit boundaries are not known?

Another problem is that even if bit edge is known, it can be desirable to restrict the duration of coherent integration period PreD to reduce the number of Doppler searches or have more protection against clock or user dynamics. But sensitivity is limited by restricting PreD.

For Glonass, the same conventional approach would use PreD of 9 ms when bit edge is not known since the Manchester code (FIG. 8) used in Glonass causes a periodic flip (i.e., a further multiplication by minus-one) every 10 ms. Average (expected) de-sense for Glonass because of unknown bit edge for PreD of 9 ms is an undesirably-large ~4 dB de-sense as compared to ideal performance with a bit-aligned PreD of 20 ms. A corresponding problem thus also confronts the art, namely how can the Glonass acquisition sensitivity be improved when the bit boundaries are not known and given the periodic flip?

Accordingly, substantial departures in GNSS receiver and other spread spectrum receiver technology are sought and would be most desirable and beneficial in this art.

SUMMARY OF THE INVENTION

In general, and in one form of the invention, an integrated circuit for facilitating spread spectrum reception of data having a data bit period includes an hypothesis search circuit operable to correlate a pseudorandom code with a signal input based on a received signal to produce correlation results, and a processor circuit operable to coherently integrate the correlation results over plural sample windows staggered relative to each other in the coherent integration interval, and to non-coherently combine the coherently integrated results corresponding to the plural sample windows to produce a received signal output, whereby enhancing performance.

In general, and in another form of the invention, a receiver includes an analog receive section, and a signal processing section coupled with the analog receive section to digitally process GPS and Glonass signals and to recover data having a data bit period in respective satellite signals, the signal processing section having an hypothesis search circuit operable to correlate a pseudorandom code with a signal input based on a received satellite signal to produce correlation results, and a processor circuit operable to coherently integrate the correlation results over plural sample windows staggered relative to each other in the coherent integration interval, and to non-coherently combine the coherently integrated results corresponding to the plural sample windows to produce a received signal output.

In general, and in an electronic process form of the invention for spread spectrum signal processing of a signal having a data bit period, the process includes electronically correlating a pseudorandom code with a signal input based on a received spread spectrum signal to produce correlation results, electronically integrating the correlation results coherently over plural sample windows staggered relative to each other in the coherent integration interval, and non-coherently combining the coherently integrated results corresponding to the plural sample windows to produce a received signal output.

In general, and in a further form of the invention, an integrated circuit for spread spectrum reception includes an hypothesis search circuit operable to search hypothesis frequencies and code lags to produce correlation results, and a processor circuit operable to combine the correlation results for at least two hypothesis frequencies at a given code lag, the frequencies separated by a predetermined frequency difference, and to identify a peak in the combined correlation results.

In general, and in another further form of the invention, a receiver for bit-edge-asynchronous detection of a GNSS signal such as Glonass, includes a search circuit having an hypothesis-search circuit operable to execute correlations spaced apart a predetermined amount in hypothesis frequency according to multiple staggered coherent integration windows that are co-prime with half a data bit-period, and a noncoherent integration mechanism for combining across a dwell the results of the correlations spaced apart a predetermined amount in frequency according to multiple staggered coherent integration windows, to find a composite peak corresponding to a Doppler frequency halfway between a pair of such hypothesis frequencies.

In general, another electronic process form of the invention for spread spectrum signal processing includes electronically searching hypothesis frequencies and code lags to produce correlation results, and electronically combining the correlation results for at least two hypothesis frequencies at a given code lag, the frequencies separated by a predetermined frequency difference, and to identify a peak in the correlation results.

Other circuits, receivers and processes are also disclosed and claimed.

BRIEF DESCRIPTION OF THE DRAWINGS

FIG. 17B shows a digital processing section for GPS and Glonass signals.

Corresponding numerals in different Figures indicate corresponding parts except where the context indicates otherwise. A minor variation in capitalization or punctuation for the same thing does not necessarily indicate a different thing. A suffix .i or .j refers to any of several numerically suffixed elements having the same prefix.

DETAILED DESCRIPTION OF EMBODIMENTS

A GPS receiver computes the user position by triangulation or trilateration using measured distances to enough satellites to achieve a position fix. Each GPS (USA) satellite (SV)

repeatedly transmits 1 ms long, 1023 length PN-coded bits every 20 ms by BPSK modulating the PN-code at 50 Hz rate (i.e., 20 PN pseudonoise code repetitions per data bit) at a carrier frequency of 1575.42 MHz, among others.

Figure 9:
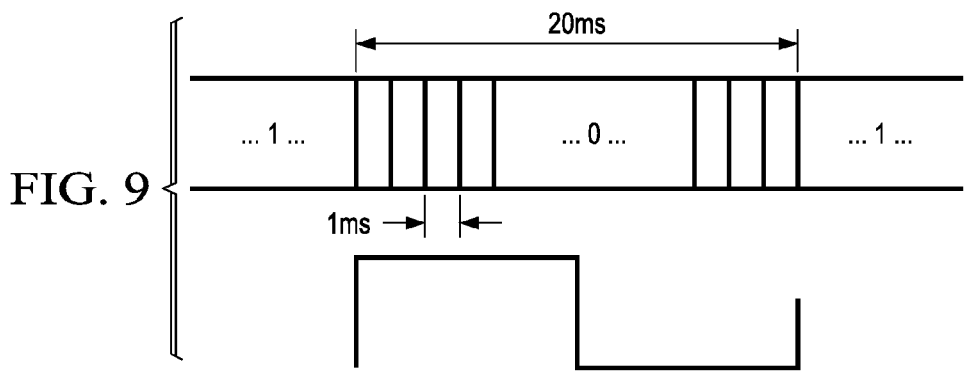
FIG. 9 is a composite diagram of a single 20 ms data bit period including 1 ms segments with a simplified waveform diagram depiction of a Manchester code square wave for Glonass aligned beneath it.

A Glonass receiver also computes the user position by triangulation or trilateration using measured distances to enough satellites to achieve a position fix. Each Glonass (Russian) satellite (SV) repeatedly transmits 1 ms long, 511 length PN-code at a carrier frequency of 1.602 GHz+/−562.5 KHz*N (where N is the FDMA slot of the SV). The satellites transmit bits every 20 ms by BPSK modulating the PN-code at 50 Hz rate (i.e., 20 PN code repetitions per data bit, but Manchester coded). As shown in FIG. 9, a sequence of bits 1, 0, 1, . . . is transmitted, each bit occupying 20 ms. Manchester coding is performed on each bit (e.g. "0") and flips the bit polarity at the middle of the bit (i.e., after 10 ms, shown by the square wave in FIG. 9).

Figure 5:
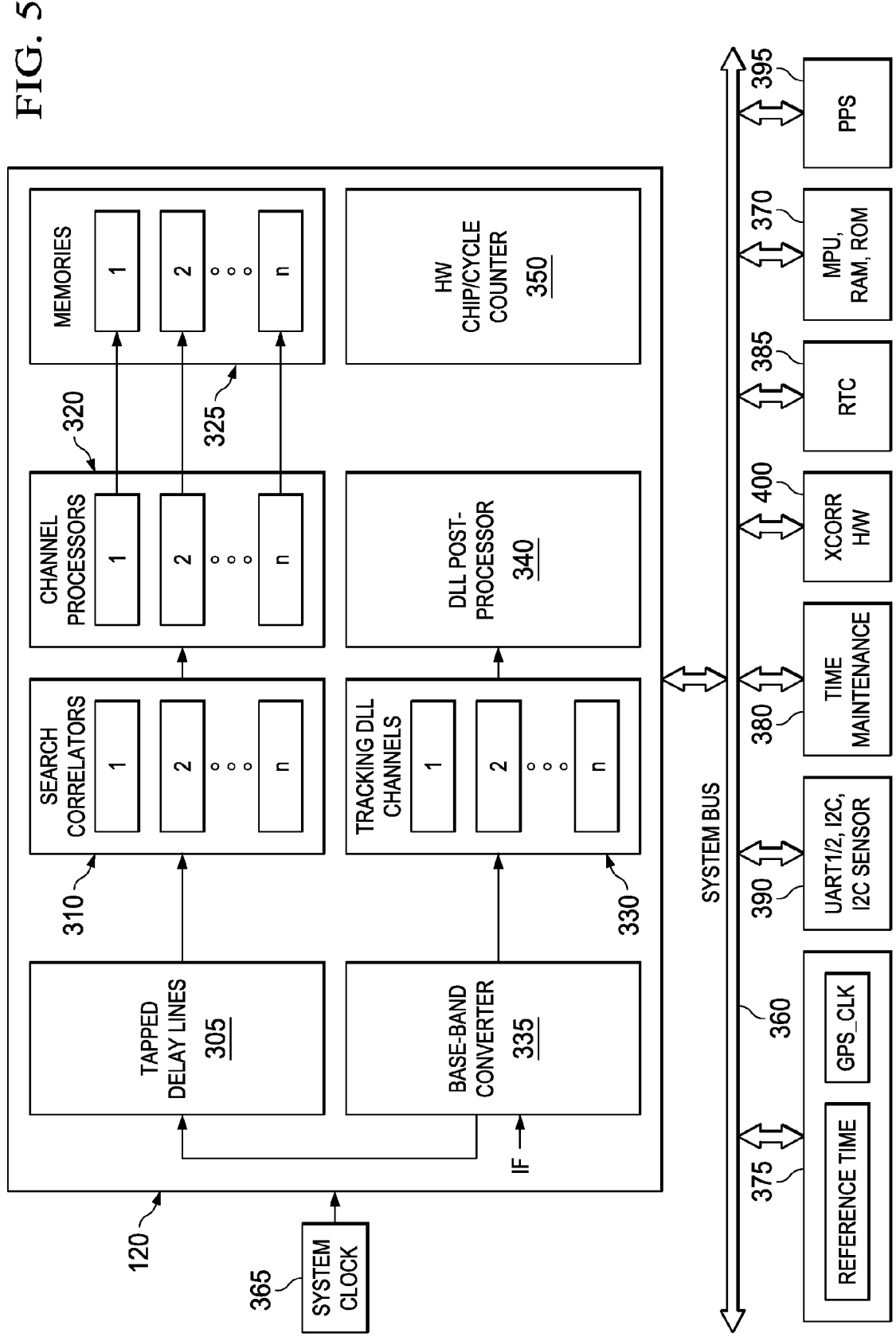
FIG. 5 is a block diagram of a portion of the positioning receiver of FIG. 2 and improved according to inventive structures and processes detailed in the other Figures.
Figure 7:
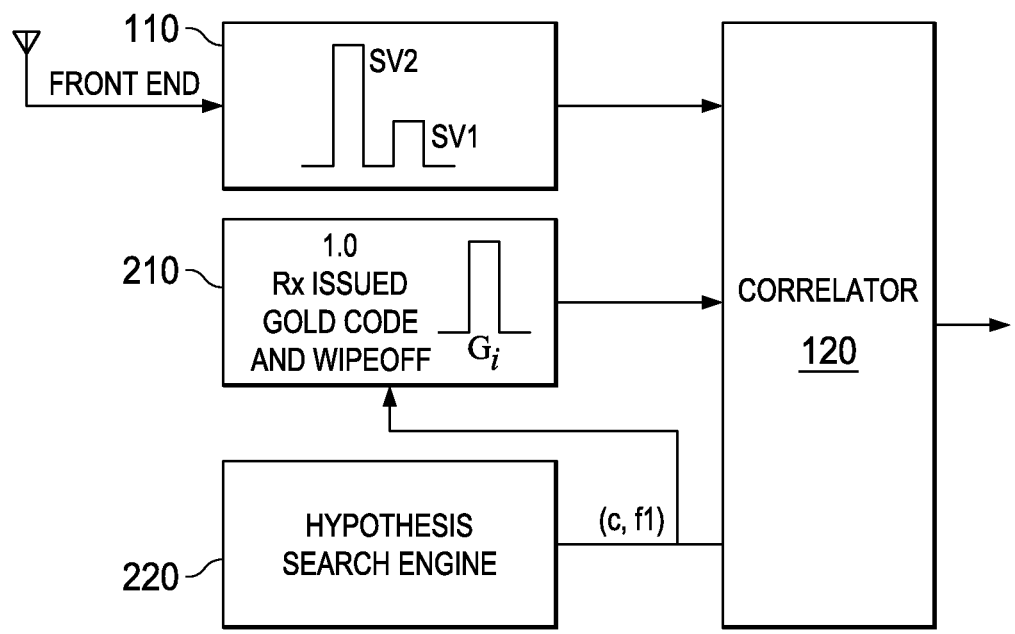
FIG. 7 is a block diagram showing receiver structures operated upon according to the hypothesis search embodiment of FIG. 6.

In FIGS. 5 and 7, receivers search for presence of these PN codes through correlation. Accordingly to detect a satellite, the receiver searches for the presence of the PN code in the received signal through the process of correlation and accumulation, or dwell. The location (in an hypothesis space having dimensions of code lag and Doppler frequency) at which a correlation peak is found has the information about the propagation delay between the satellite SV and the receiver. This information is used for calculating position of the user. (See a more extended discussion of that process later hereinbelow.)

The motion of the satellite in the direction toward or away from the receiver 100 introduces a frequency shift called Doppler. Receivers in general will see a Doppler effect because of satellite motion, user motion and receiver clock offset from the atomic clock time-base of the satellite. Amounts of Doppler frequency shift due to satellite motion are likely to be in the range of approximately [−5 KHz, 5 KHz]. Receivers execute what is called an hypothesis search across Dopplers and code lag to detect presence of signal. Due to the motion of the satellite, this search for the PN code is performed for multiple frequencies, as well as for code lags, to find the Doppler-shifted frequency $f_d$ at which a correlation process will peak.

In FIG. 7, receiver 100 finds satellites by locally generating different PN sequences and electronically correlating or synchronizing them with receptions from available satellites, which satellites each have a unique PN sequence respectively assigned to them. In the receiver processing, Doppler frequency removal (wipe-off) is performed for each satellite ahead of the correlating of PN sequences at different code lags, so that correlation produces narrower single peaks with higher strengths as code lag is searched too. The receiver monitors for high correlations to individually receive (and distinguish) satellite signals of different satellites from each other. The information data modulated on a given received satellite signal then is demodulated to obtain the information, including the time of transmission, satellite clock correction parameters and ephemeris data. The information derived from the correlation peak is used for calculating position of the user.

Figure 6:
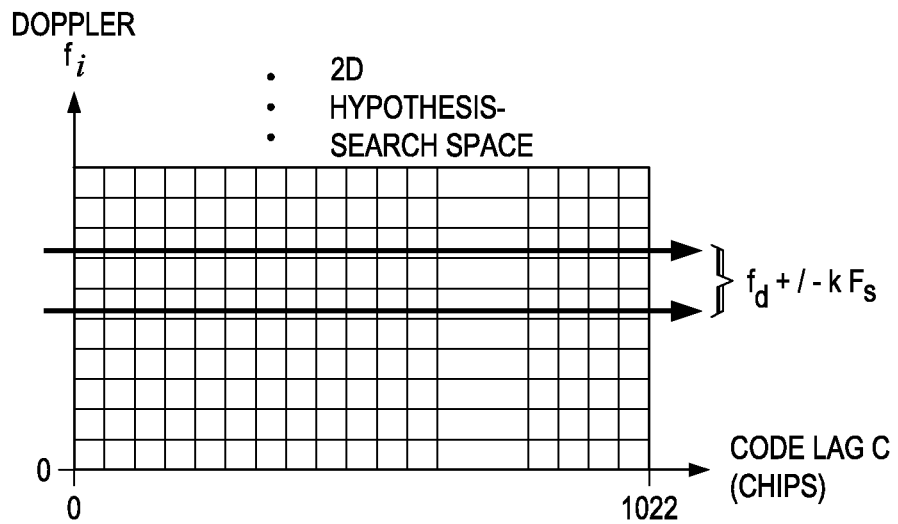
FIG. 6 is a graph of an hypothesis search space having two dimensions for Doppler and code lag (code phase), showing receiver embodiments of structures and processes with offset hypothesis frequencies $f_d +/- k\, Fs$ (Doppler plus/minus predetermined fraction k of BPSK 50 Hz symbol rate).

By contrast with a conventional approach, one type of process embodiment herein according to FIGS. 6-7 performs two (or more) correlation processes at different hypothesis frequencies, and combines the correlation outputs, and then determines the Doppler-shifted frequency $f_d$ as the average of the hypothesis frequencies at which the combined correlations performed for those hypothesis frequencies will peak.

Rather than perform correlations at the hypothesis Doppler frequency or extend integration time, some of the disclosed embodiments perform correlation at two different Doppler frequencies that are offset +/−kFs (e.g., +/−37.5 Hz) away from the real Doppler hypothesis. (Fs is a Manchester square wave repetition rate, e.g. 50 Hz, k is a constant, e.g. 0.75 or 1.0). This way, two of the hypothesis frequencies are offset in frequency from their average plus and minus a predetermined amount kFs approximating the repetition rate. Combining these correlation results together improves the Glonass detection sensitivity performance in asynchronous networks (i.e., wherein the bit-edge is not known at least initially).

Various embodiments thus offer a way to remarkably improve Glonass acquisition sensitivity, which can improve the success rate of getting position fixes in weak signal conditions as well as reduce the time-to-first-fix. In this way, opportunities are conferred for superior performance and sensitivity test margin.

To achieve high GNSS receiver sensitivity, it would be desirable to perform 20 ms long coherent integration. However, that type of integration needs known bit-edge boundaries. In important use cases, such as asynchronous assisted GNSS, the bit edge boundaries are unknown at the start. Consequently, these circumstances pose a problem of how to improve GPS, Glonass or other GNSS acquisition sensitivity when bit boundaries are not known, at least initially, and further given the complication of the periodic flip in Glonass Manchester coding.

Hitherto, in legacy GPS design, a PreD of 19 ms is used when the bit edge is not known. This is because the number 19 is co-prime with 20, and therefore the loss due to bit-edge transitions averages out over a long dwell time. The average de-sense due to PreD of 19 ms is about 1.6 dB as compared to an ideal bit-aligned PreD of 20 ms. Extending the co-prime concept to Glonass leads to and constrains use to a PreD of 9 ms or less, due to the meander sequence and attendant signal loss on Glonass because its Manchester coding flip at 10 ms in the middle of the 20 ms signal bit interval. Painfully, for Glonass this loss is about four (4) dB in performance compared to ideal 20 ms coherent integration.

Glonass and other GNSS acquisition sensitivity is thus problematically limited by the longest coherent integration period (PreD) possible for a given integration time. For Glonass, as per legacy design, maximum PreD is only 9 ms when the instant of each bit edge is not known or not initially known since the Manchester code causes a flip every 10 ms in a data bit of period 20 ms. As noted above, the average de-sense because of unknown bit edge for PreD of 9 ms will be ~4 dB as compared to ideal bit-aligned PreD of 20 ms for Glonass. However, various embodiments significantly improve the Glonass acquisition sensitivity herein when the bit boundaries are not known.

Various ways are provided herein to improve further the GPS/Galileo/Glonass or other GNSS receiver acquisition sensitivity when the bit boundaries are not known. In some of the embodiments, described later hereinbelow, multiple coherent integrations are performed and staggered within the coherent integration interval, which may be longer, shorter or equal to the data bit period. Such multiple staggered coherent integrations accumulate signal while partially canceling noise, and hence improving the sensitivity. The staggering may also be over the data bit period, e.g. over 20 ms for GPS and over 10 ms Manchester code interval for Glonass, thereby reducing the bit-edge straddling losses also and hence improving the sensitivity. Staggering is applicable in scenarios without knowledge of bit edge. Moreover, whether or not the instant of the bit edge is known, various embodiments that perform staggered multiple coherent integrations over the data bit period, and even longer, can allow unrestricted duration of coherent integration period PreD and confer increased sensitivity. Improved sensitivity in scenarios of clock or user dynamics is a most desirable consequential impact. Staggering herein is beneficial not only due to staggering across bit periods but in general as well.

In a particular category of embodiments described next hereinbelow, insights about the power spectral distribution (PSD) of the Manchester code in Glonass are taken as their point of departure in addition or instead.

Figure 10:
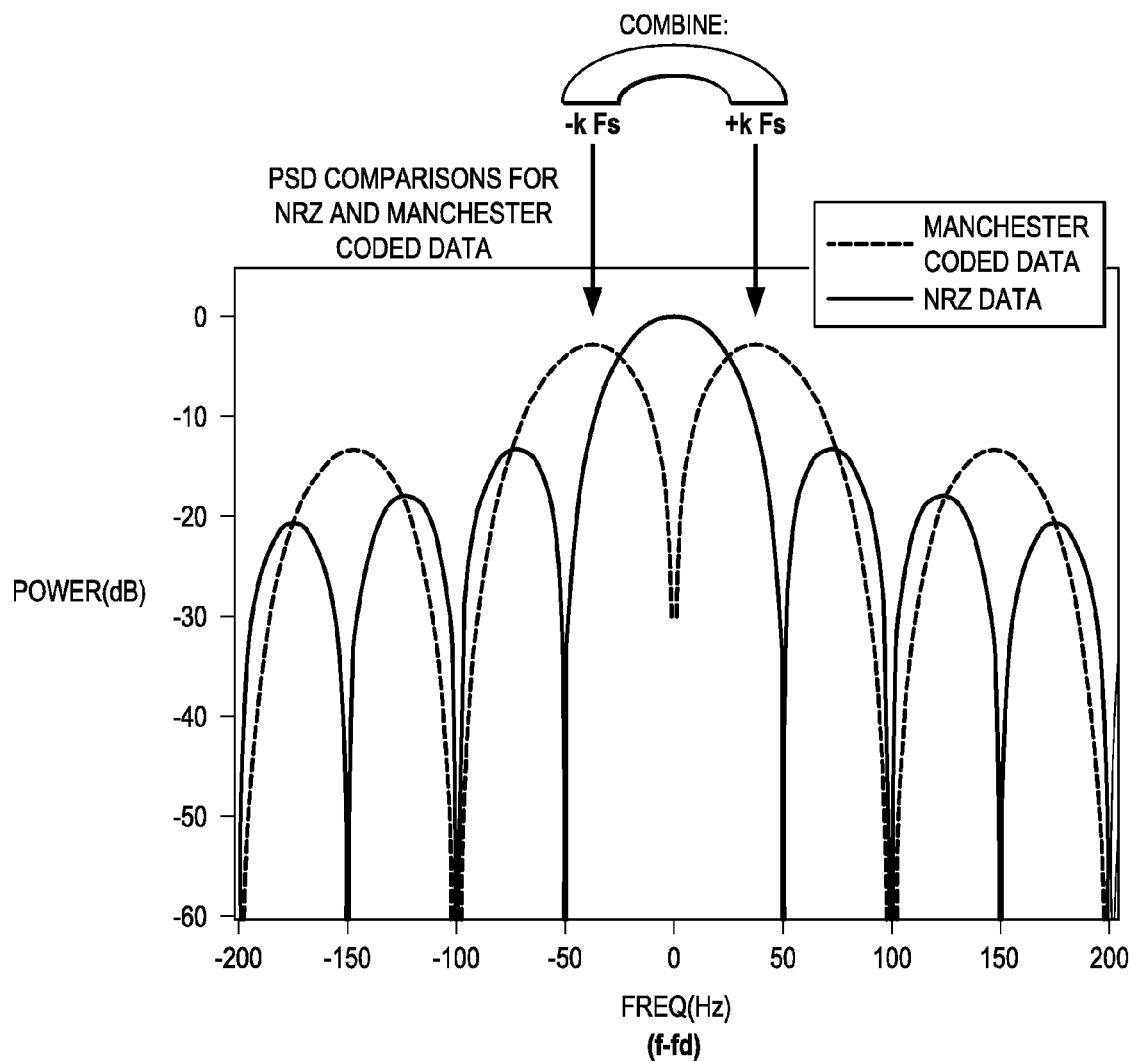
FIG. 10 is a diagram of power spectral distribution (PSD) versus frequency on either side of the Doppler frequency (0) having respective plots for Manchester coded data and NRZ data.

Description of that category of embodiments at this point first addresses the periodic flip of the Manchester code in Glonass. Normally, a PreD of 19 ms applied to Glonass would cause the integration to straddle the Manchester code bit boundaries of 10 ms, leading to heavy loss of received signal energy. In FIG. 10, a power spectral distribution (PSD) shows that in the frequency domain this loss of energy can be explained as signal energy of the Manchester code of Glonass getting split into two main lobes ~75 Hz apart as compared with a single main lobe for NRZ (non-return to zero) of GPS. FIG. 10 is a frequency domain interpretation showing loss of energy if 19 ms coherent processing is directly applied to Glonass when Doppler hypothesis frequency $f=f_d$ is used in a single correlation. This particular FIG. 10 shows curves for a coherent integration PreD of 20 ms bit-edge-aligned. Various embodiments overcome this loss of energy by using a different processing method, where energy from these two lobes instead is combined and used effectively to increase the detection performance.

Figure 3A:
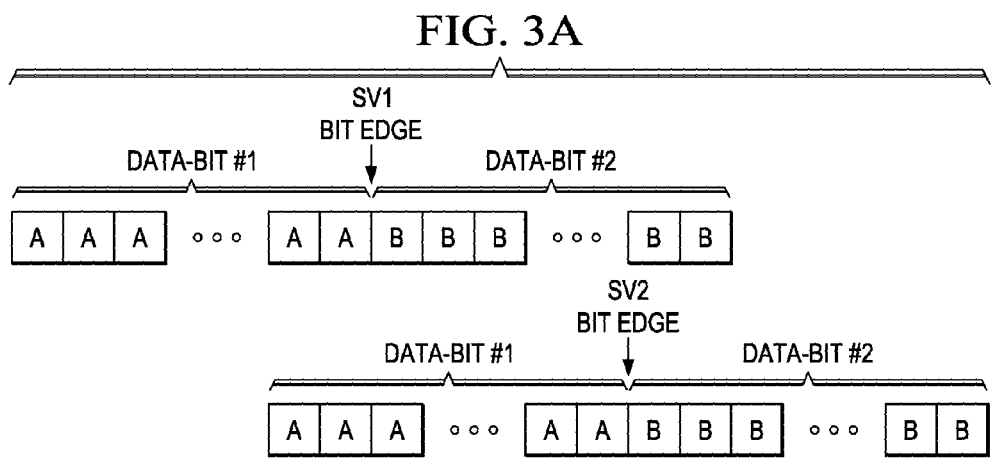
FIG. 3A is a diagram of received signal information versus time for the receiver of FIG. 2 showing repetition of a symbol A followed by repetition of another symbol B with randomly displaced inter-symbol bit edges for each of two satellites SV1 and SV2.

For searching a Glonass satellite at Doppler frequency $f_d$, a conventional approach might perform correlation at $f_d$ and perform coherent integration of up to about 9 ms. In FIGS. 3 and 6, among other remarkable characteristics, a receiver embodiment herein performs and combines two correlations instead at a Doppler of $(f_d-kFs)$ Hz and at $(f_d+kFs)$ Hz, where Fs=50 Hz Manchester code rate, instead of performing and using one correlation at Doppler frequency $f_d$ itself. Expressed another way, the FIG. 7 hypothesis search engine 220 and the correlator 120 operate on various hypothesis frequencies that are issued for correlation without direct interpretation of each as a Doppler frequency. Then, such receiver embodiment combines those correlation results for hypothesis frequencies that are offset plus/minus apart by non-coherently adding those correlation results, thus giving better detection sensitivity of about 0.5 dB-to-0.75 dB or about 1 dB sensitivity gain.

Figure 11:
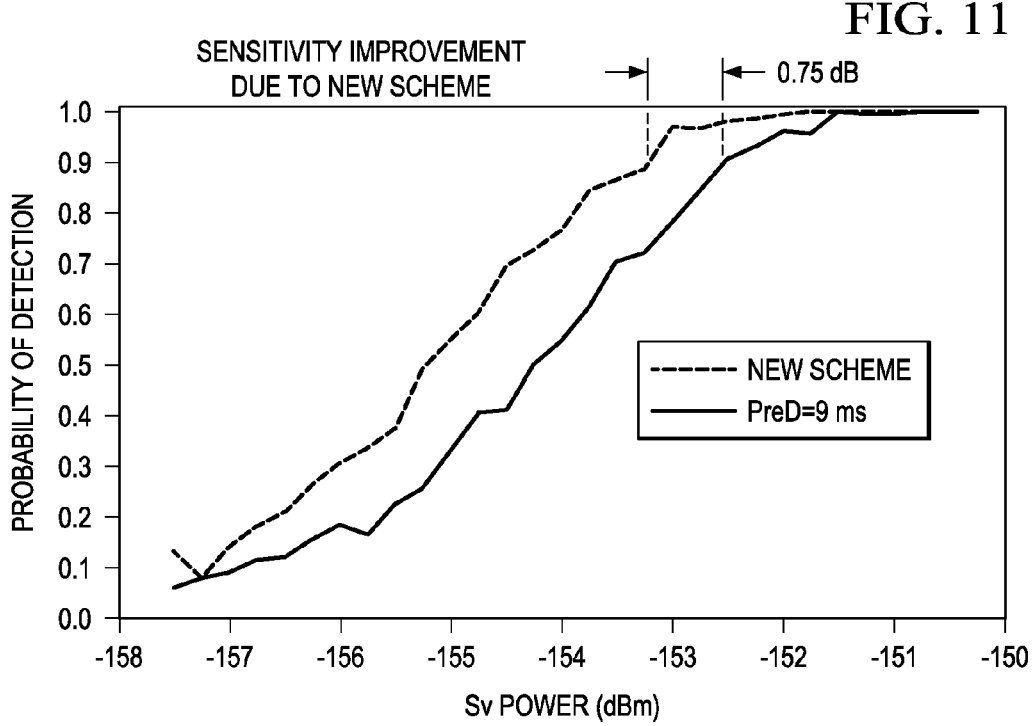
FIG. 11 is a graph of probability of detection versus satellite vehicle (SV) power (dBm), and having respective plots to compare an embodiment as in FIG. 6 with conventional PreD=9 ms for Glonass, the plots showing about 1 dB sensitivity improvement.

In FIG. 11, simulation results show a sensitivity improvement of about 1 dB as compared to PreD=9 ms alone. This results in a SNR gain of about 2 dB as compared to methods that might use PreD of 9 ms alone for Glonass. Combining the correlation results of FIGS. 6 and 10 gives a peak as a function of a frequency f halfway between the hypothesis frequencies, and that halfway-frequency f at which a reception peak occurs is interpreted as the Doppler-shifted frequency $f=f_d$ of the Glonass satellite transmitter. This interpretation is based on a pre-existing knowledge that the Glonass transmission is 50 Hz Manchester coded on 20 ms BPSK with its PSD as in FIG. 10.

The reason why the Sensitivity improvement of about 1 dB occurs when SNR improvement is about 2 dB is because Sensitivity improvement is measured as the delta change in signal power for a given SNR, i.e., where the SNR improvement is wiped off or held constant. Put another way, the Sensitivity improvement is the horizontal width difference shown for curves in FIG. 11 at a given probability of detection. By contrast, the SNR improvement relates monotonically to the vertical height difference in probability of detection for those same curves in FIG. 11 at a given signal power.

SNR improvement in dB being about twice the Sensitivity improvement is approximately true specifically at the important low input signal SNRs while summing the signal using non-coherent integration, (e.g. using absolute value abs integration or squaring integration). The main reason why SNR improvement exceeds the Sensitivity improvement is believed to be the squaring loss due to the non-coherent operation while integrating signal. But at high input signal SNRs, the Sensitivity improvement matches or essentially equals the SNR improvements. (Heuristically, consider the factor of "2" and relative contributions of terms as between the ratios $S^2(t)/(2S(t)N(t))$ and $sqrt(S^2(t)/N^2(0)$ evolving from non-coherent accumulation of squared signal-plus-noise $(S(t)+N(t))^2$. Strictly speaking, squaring loses phase information and thus coherent integration contributes to less SNR improvement than coherent integration does.

Equation (1) for Sensitivity is:

$$\text{Sens}=S_{dBm} \qquad (1)$$

where S is minimum signal power in dBm at which the receiver delivers a specified probability of detection (as in FIGS. 11-12 and 14-15) or a specified signal-to-noise ratio SNR. De-sense refers to a number of dB of diminished sensitivity relative to the sensitivity which would be enjoyed under an ideal receiver processing condition or some receiver processing condition used as a reference.

Equation (2) for signal-to-noise ratio SNR in decibels (dB) is:

$$\text{SNR}=20 \log_{10}(S/N) \qquad (2)$$

where S is signal voltage and N is noise voltage e.g. in microvolts.

Considering the simulation results in light of these equations for Sensitivity and SNR leads to the Sensitivity improvement of about 1 dB and SNR improvement of about 2 dB.

Another way to give insight into the above sensitivity improvement for Glonass (i.e. Manchester coded SV signal) views the boost in the signal energy due to addition of signals 2 kFs apart as higher than noise because of higher decorrelation of noise. This results in, or at least contributes to, the SNR improvement and hence the Sensitivity improvement.

Figure 8:
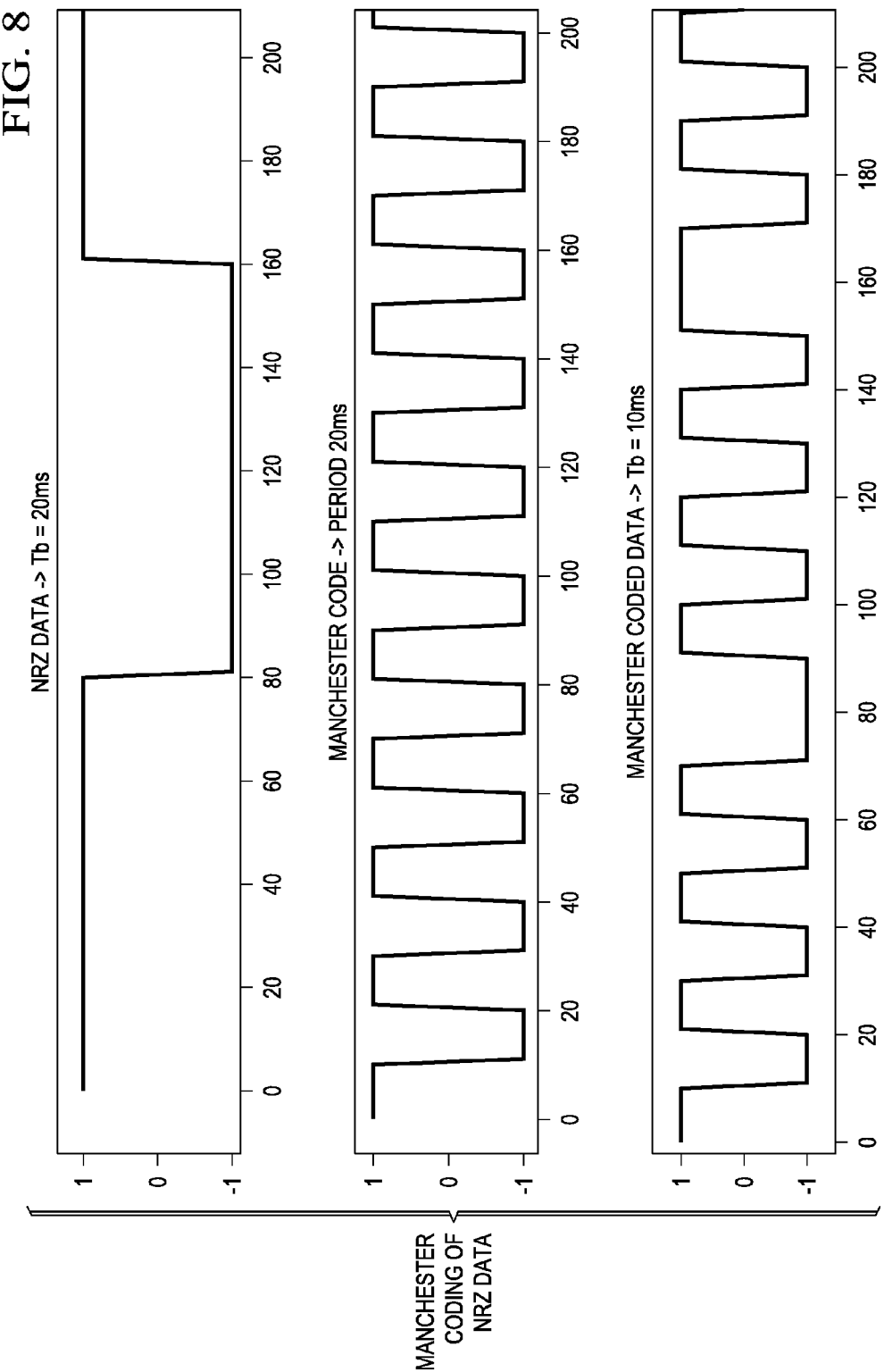
FIG. 8 is a composite diagram including three voltage-versus-time waveform diagrams respectively showing Manchester coding of non-return-to-zero (NRZ) data, Manchester code square wave with period 20 ms, and Manchester coded data such as for Glonass resulting from multiplication of the first two waveforms.

Focusing further on FIG. 10, the PSD comparison showing the split lobes of Manchester code refers to power spectral distribution PSD of Glonass Manchester coded data, e.g. at bottom in FIG. 8, compared to GPS NRZ coded data (e.g., "11110000111") at top in FIG. 8. (The width of each lobe in both cases will vary approximately with the number of zero crossings per second in the actual NRZ data, e.g. at top of FIG. 8, and the FIG. 10 illustration is generally representative.)

One example embodiment performs two coherent integrations e.g. in parallel using 9 ms windows at $f_d+/-kFs$ and then non-coherently adds the results. The frequency Fs is the Manchester code rate of 50 Hz that is impressed on a 20 ms data stream of information coming in from the Glonass satellite SVi. A value equal to a constant k times that bit rate is here used as a predetermined offset to a given hypothesized Doppler in the hypothesis search circuit or firmware that generates each latest hypothesized frequency f. So the expression $f=(f_d+/-k Fs)$ means that the conventional hypothesis search on code lag and Doppler is replaced by an hypothesis search on the hypothesized code lag and a frequency hypothesis-pair: two frequencies $(f_d+kFs)$ and $(f_d-kFs)$.

Comparing FIG. 10 with FIG. 6, the two hypothesized frequencies are search-processed substantially in parallel across code lag/frequency space and have what would otherwise be the Doppler hypothesis $f=f_d$ instead be replaced by this pair of hypothesized frequencies ($f_d$+kFs) and ($f_d$−kFs) that have the conventional Doppler hypothesis frequency $f_d$ as their average, i.e. halfway between the hypothesized frequencies. In some embodiments as in FIG. 7, the hypothesis search is carried out sequentially and Glonass satellite peaks are found by modifying the FIG. 5 channel processors 320 and/or their processes of operation to include non-coherent summing of pairs of correlations on code lag/frequency hypotheses stored in the correlation output memories 325. That way, correlations in area 310 are suitably established and indeed no extra correlations may even be involved in some embodiments. Moreover, the non-coherent summing as in Equation (3) represents acceptable added processing in the channel processing area 320 to find the peak of FIG. 10 combined correlations for the Manchester coded Glonass satellite signal.

$$S=|\text{Corr}[c_i,(f_d+kFs)]|+|\text{Corr}[c_i,(f_d-kFs)]|. \quad (3)$$

Notice that while the FIG. 8 Manchester phase reversal is every 10 ms (50 Hz, one cycle every 20 ms in middle waveform of FIG. 8), the two main lobes flanking $f=f_d$ (i.e. $f-f_d=0$ in FIG. 10) are separated by 75 Hz. Heuristically, it is as if a pulse modulation frequency at k=¾ of the Manchester code rate modulates a carrier at Doppler frequency $f_d$, and causes symmetric side lobes in the frequency domain including the pair of side lobes spaced at +/−¾ of 50 Hz, or 1.5×50 Hz=75 Hz apart. The two lobes peak at +/−37.5 Hz offsets from the Doppler frequency $f_d$ and flank a deep null at $f_d$. (The +/−37.5 Hz peaks are based on the mostly-random or non-periodic nature for the purposes here of the 20 ms data bits over a dwell, notwithstanding that they are in another sense indeed information-carrying data.) This is a power spectral phenomenon, represented by $\sin c^2\theta \sin^2\theta$, of Manchester code itself prior to the processing herein and not caused by the fd+/−k Fs hypothesis search process embodiments. Instead, that power spectral phenomenon is now recognized herein as relevant to satellite detection, and the fd+/−k Fs hypothesis search process embodiment is remarkably provided for Glonass satellite detection to be sensitive and responsive to that power spectral phenomenon of Manchester code. With that responsive process embodiment now discovered, the energy from the input signal is better harvested to give an increased SNR (by about 2 dB or more) and a resultant sensitivity improvement (by about 1 dB or more) that hitherto was seemingly unthinkable from the conventional technique using a coherent integration of 9 ms.

(Sin c($\theta$) means $\sin(\theta)/\theta$, where $\theta$ is $(\pi/2)(f-f_d)/F_S$.). Manchester minima are seen to be spaced every $2F_S$=100 Hz at points where $\theta=n\pi$. In FIG. 10, the power spectral distribution PSD of NRZ code of GPS is proportional to $\sin c^2(2\theta)$ and peaks at $f-f_d=0$ with minima spaced every 50 Hz, due to NRZ transitions only occurring by definition at 20 ms or some multiple, and with maxima situated about halfway between the minima.)

The coherent correlations based on hypothesized carrier Doppler frequencies corresponding to the two frequency lobes are non-coherently added in FIGS. 6 and 10 because a frequency offset of actual carrier Doppler from either hypothesized carrier Doppler can be present during satellite acquisition. Consequently, the addition of energies at the two hypothesized carrier Doppler frequencies is performed non-coherently because during satellite acquisition a residual Doppler can be present, which could prevent accumulation of a detectable peak for the satellite over the dwell if the FIG. 10 combining of coherent correlations at +/−k Fs were also coherent. Also, the circuitry and processing for FIGS. 6 and 10 advantageously does not need to have a specified bit edge time instant provided, or in other words it is blind to bit edge information. Thus, the position of the coherent integration window (e.g., Pred=19, or Pred=9, etc) can straddle successive bit periods.

In some more complex embodiments, other pairs of the symmetric side lobes could be processed such as by performing an hypothesis search that has four hypothesis frequencies searched in parallel, e.g., a first pair fd+/−¾ Fs and a second pair fd+/−3 Fs. Heuristically, the multiple pairs of split lobes in FIG. 10 are like a double sideband modulation spectrum of NRZ data-bits spectrum impressed on a square wave 50 Hz Manchester code 'carrier.' Since the Manchester code is a square wave, it has sinusoidal harmonic 'carrier' components only at the odd harmonics of 50 Hz. The main lobes are somewhat displaced toward each other and inward to 37.5 Hz from 50 Hz, because 50 Hz is an NRZ null at 100 Hz down in frequency from the Manchester code 150 Hz third harmonic 'carrier' component, heuristically speaking Notice that the average frequency of each symmetrically-situated pair of lobes is the Doppler frequency $f_d$. Also notice that the second or outer pair of lobes at frequencies fd+/−3 Fs is approximately 10 dB down from the first pair of lobes, and therefore considerations of diminishing returns and extra processing burden become relevant.

Figure 12:
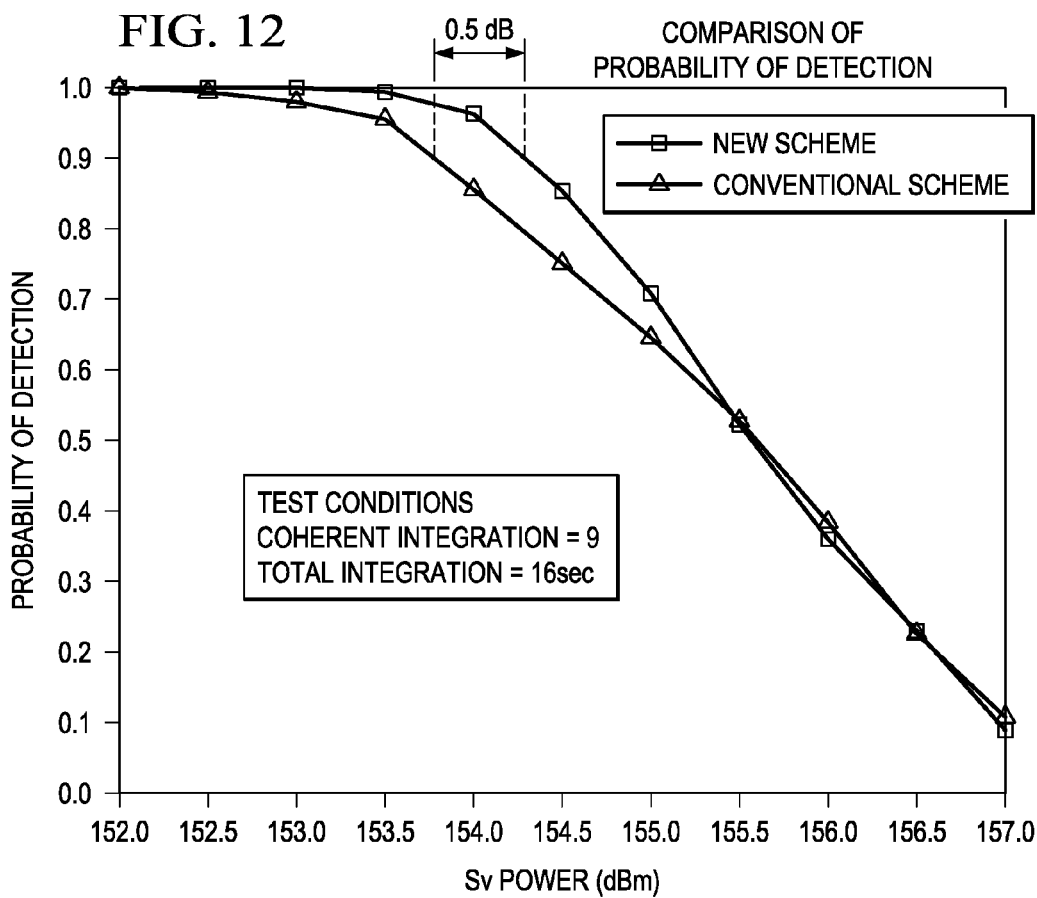
FIG. 12 is another graph of probability of detection versus satellite vehicle (SV) power (dBm), and having respective plots with 16 seconds long integration to compare an embodiment as in FIG. 6 with conventional PreD=9 ms for Glonass, the plots showing a 0.5 dB sensitivity improvement.

In FIG. 12, an about 1 dB Sensitivity enhancement results with the following Test conditions: Coherent integration=9 ms, Total integration=16 seconds. (The reversal of the FIG. 12 graph on the horizontal axis relative to FIG. 11 is merely cosmetic.)

Sensitivity for Glonass acquisition in asynchronous networks is thereby improved by about 0.5 dB to about 1 dB. GPS and Glonass performance numbers are a key care-about for manufacturers and users. Every 0.5 dB of Sensitivity is a significant factor. GNSS receivers as taught herein can provide superior performance.

The incoming Glonass signal r(t) is a multiplication product of factors for
i) a 50 Hz square wave for Manchester code (FIG. 9)
ii) NRZ signal bits that can change as often as every 20 ms (50 Hz)
iii) Doppler shift in a range of perhaps −5 KHz to +5 KHz
iv) Spectrum spreading pseudorandom code (Gold code) affected by actual code lag c1.

Some embodiments use a process of correlation of that incoming Glonass signal r(t) is an integral (implemented by multiply-accumulation) over 9 ms, by accumulating the multiplication product ABCD of factors as listed next. The result of the integration returns the NRZ signal bits ("ii" above) and some noise.

A) incoming Glonass signal r(t)
B) a Fs=50 Hz square wave for Manchester code
C) Doppler hypothesis in the −5 KHz to +5 KHz range of Dopplers
D) Spectrum de-spreading (same Gold code) with code lag hypothesis c.

Notice that since the factors A, B, C, D are in a multiplication product, that they can be applied in any order or subsets of product factors by different embodiment implementations and then correlated, by which correlation the whole product ABCD is formed and accumulated, and followed by a non-coherent (magnitude or squared) accumulation over the dwell. Accordingly, some of the embodiment implementations are represented by the following non-exhaustive list, which indicates by parentheses and brackets different variations on the circuitry of FIG. 7:

1) A×[(B×C)×D]: Uses FIGS. 6 and 10 approach (offset pair of Dopplers), impressed with Gold code, and then correlate with r(t).

2) A×[C×(B×D)]: Issue ten 1 ms Gold code repetitions, then ten negations, etc, all with code lag hypothesis c, impressing same on Doppler hypothesis, and then correlate with r(t).

3) (A×C)×(B×D): Wipeoff Doppler from r(t), then correlate the result with a block that issues ten 1 ms Gold code repetitions, then ten negations, etc., all with code lag hypothesis c. In the satellite communication perspective, Doppler effect is seen on both the carrier and the code, see note below.

4) Other combinations of sub-combinations of ABCD.

Note: Doppler is present on both carrier and code. The code Doppler is carrier Doppler divided by the ratio of carrier frequency to code chip rate. (For GPS that ratio is 1540=1575.42 MHz/1.023 Mchps, so divide GPS carrier Doppler by 1540. The ratio is analogously configured for any other carrier frequency and/or any other chip rate for whichever particular GNSS SV is being received.) Accordingly, Gold code factor "D" hereinabove is generated with an hypothesized code Doppler impressed on it and equal to e.g. $1/1540$ times the hypothesized carrier Doppler "C." For instance, in subparagraph (3) hereinabove and FIG. 7 the receiver removes the carrier Doppler from the incoming signal r(t) and correlates with the locally-generated Gold code having the code Doppler impressed on it. That way, the correlation is effective to remove the code Doppler as well.

Figure 13:
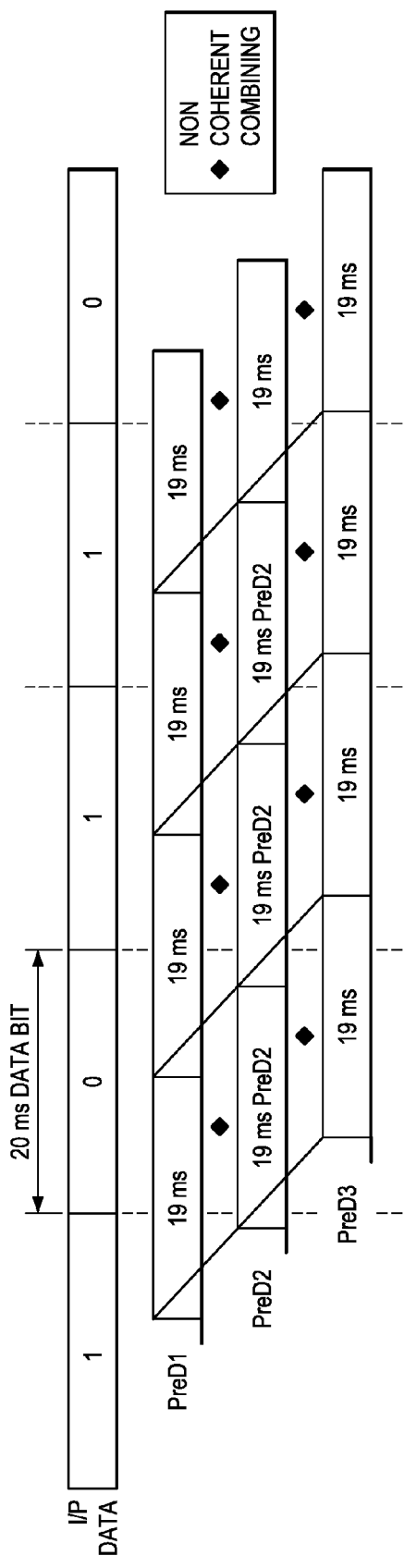
FIG. 13 is a composite diagram showing a simplified depiction of data bits having initially-unknown bit edges of FIGS. 3A-3C from a GPS satellite, and further showing an embodiment established in the system of FIG. 5 wherein the embodiment concurrently employs three data windows for 19 ms coherent integration staggered with respect to each other approximately equally over the 20 ms data bit width.

Turning to FIG. 13, another category of embodiments introduced earlier hereinabove provides sensitivity improvement by performing and non-coherently combining multiple staggered coherent integrations in GPS, Glonass and/or other GNSS. For example, with GPS, multiple coherent integrations of 19 ms (or 20 ms) are remarkably provided and performed, each of them shifted or staggered in time by a few milliseconds. (For this GPS example, the hypothesis search beforehand is on code lag and Doppler frequency directly.) FIG. 13 shows the input (I/P) Data stream as 20 ms-wide data bits . . . , 1, 0, 1, 1, 0 . . . . Alignment slots PreD1, PreD2, PreD3 are established 19 ms wide and staggered with respect to each other as well as with respect to the input data. The results of one or more of these multiple staggered coherent integrations increases the SNR and all of the coherent integrations are then non-coherently combined.

With the non-coherent combining included, the process embodiment elegantly does not need to determine which of the coherent integrations contributed most to the performance, and the non-coherently combined result delivers increased SNR and Sensitivity. Even though noise samples are basically the same for all the staggered alignments, squaring loss is reduced and thereby confers increased sensitivity. In other words, staggering multiple coherent integrations delivers multiple coherent signal summations that accumulate strongly in the non-coherent accumulation thereof, because at least one or two of the coherent integrations is likely to lie mostly or completely in an actual 20 ms signal-bit window. Then in the non-coherent accumulation, the signal accumulation substantially exceeds the accumulation of noise because the noise correlates negligibly with itself and the non-coherent accumulation of the noise components coming out of the coherent integrations therefore partially cancels itself as to the noise. Moreover, embodiments with such staggering of multiple windows provide more accumulations than a single window and also thereby partially cancel noise, and thus are beneficial not only for addressing bit-edge-related losses but improve sensitivity in general as well.

Figure 14:
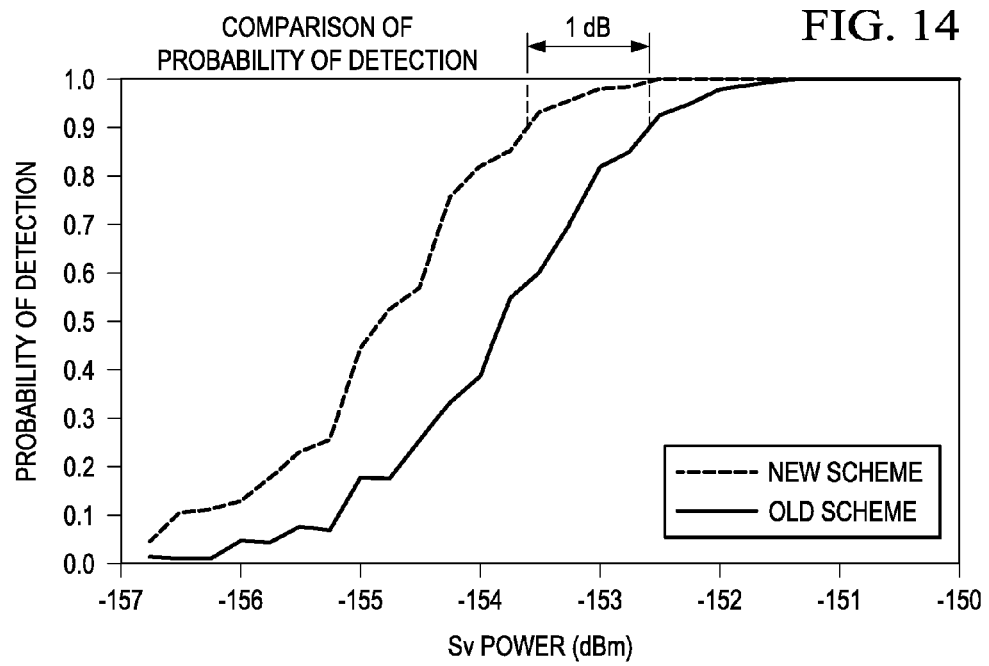
FIG. 14 is a graph of probability of detection versus satellite vehicle (SV) power (dBm), and having respective plots to compare an embodiment as in FIG. 13 with conventional single-window PreD=19 ms for GPS, the plots showing a 1 dB sensitivity improvement.

Instead of performing a single PreD of 19 ms, multiple PreDs of 19 ms are performed in FIG. 12, each of them shifted in time by few ms within or across the 19 ms interval. The PreDs are staggered by time intervals approximately equal to bit-length divided by the number m of windows, e.g. ~20/m ms for GPS. These multiple PreDs are then non-coherently combined in order to increase the SNR, or for delivering the increased SNR of coherent integration. As seen in FIG. 13, PreD1 alone would have straddled the bit edge causing loss of signal. By doing multiple PreDs in parallel which are time shifted with each other within or across a data bit boundary, at least one or some PreDs perform better than another PreD. When the processor block 320 sums up these staggered parallel PreDs non-coherently, a result or output is formed in which the overall SNR and Sensitivity are improved relative to a conventional single PreD. This process of staggered parallel preDs and non-coherent combining (signified by $+$ or +) is repeatedly performed across the dwell, as indicated in FIG. 13 by slanted drawing lines visually delimiting successive trios or groups of staggered 19 ms PreDs. In FIG. 14, a Sensitivity improvement of about 1 dB can be seen in one process embodiment of FIG. 13 as compared to a conventional single PreD.

Another way to view the reasons for this sensitivity improvement is that the number of non-coherent integrations due to the multiple staggered windows have increased with respect to a conventional single-window scheme for the same length of input data and the same coherent integration period PreD. The noise samples in each of the non-coherent integrations, though not completely uncorrelated, contribute to better noise averaging that helps to improve SNR and hence the Sensitivity of the receiver.

As described herein, various embodiments provide a dramatically different, high performance structure and process for GPS/Galileo/Glonass and other systems of positioning satellite detection as compared to merely increasing the integration time (PostD, dwell $T_D$) to improve the detection sensitivity of a satellite receiver. In a processing method embodiment for satellite detection, rather than perform correlations only for one coherent integration alignment, correlations are performed for multiple staggered alignments like PreD1, Pred2, etc. Combining these correlation results together remarkably improves the GNSS detection sensitivity performance without knowledge of the bit-edge. The correlation results are or can be combined non-coherently into one same memory space, thereby resulting in no memory overhead and a huge saving in GPS or GNSS receiver core area. The embodiments contribute improved sensitivity for GNSS acquisition in asynchronous networks wherein the time instant of the bit-edge is unknown (e.g., the time instant at which a 20 ms data bit ends and another 20 ms data bit commences).

Figure 13A:
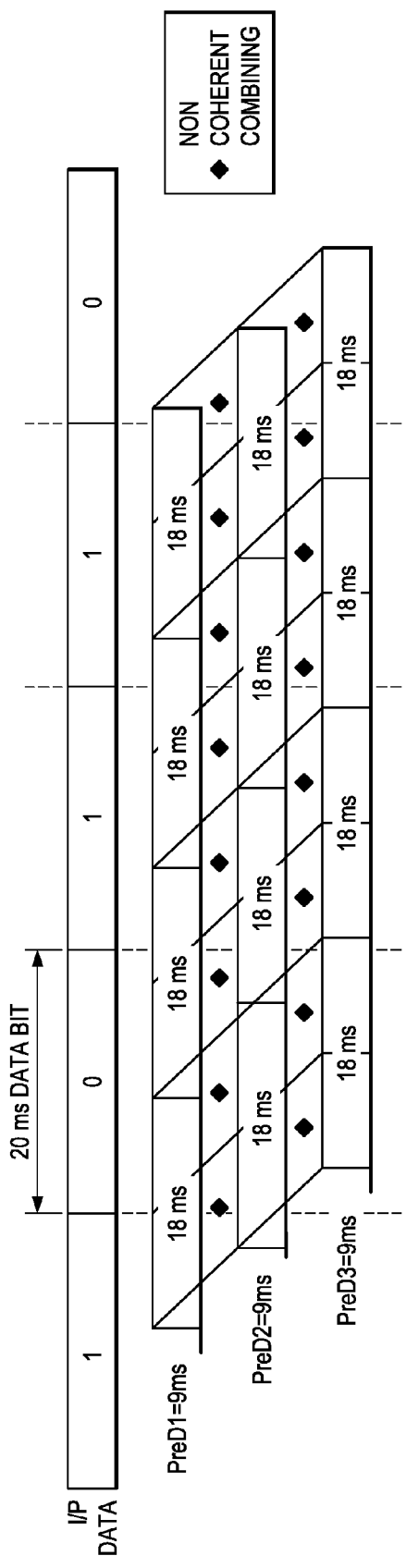
FIG. 13A is a composite diagram showing a simplified depiction of data bits having initially-unknown bit edges of FIGS. 3A-3C from a Glonass satellite, and further showing an embodiment established in the system of FIG. 5 wherein the embodiment concurrently employs three data windows for 9 ms coherent integration staggered with respect to each other approximately equally over a Manchester code 10 ms half-width of the 20 ms data bit width.

In FIG. 13A, some of the embodiments even provide a combination structure/process embodiment for the GNSS signal such as Glonass. A first part of the process includes and performs an hypothesis-search embodiment that executes correlations spaced apart (e.g., 75 Hz) in frequency. A second part of the process executes multiple staggered coherent integrations, the operation of multiple staggered integrations being performed for each different frequency hypothesis, each coherent integration having a window width (e.g. 9 ms for Glonass) that is co-prime with half the bit-length because of Manchester code (e.g. 10 ms) on the SV signal. In integration across a dwell for detecting/acquiring an SV, an embodiment using multiple staggered sets of nine 1 ms Glonass Gold code repetitions can operate without detecting or synchronizing with whichever 10 ms part (+/−) of the Manchester code is currently applicable. The coherent integration subprocess accumulates signal and partially cancels noise, and the squaring or absolute value involved in noncoherent integration permits that noncoherent integration subprocess to accumulate the results regardless of whichever 10 ms part (+/−) of the Manchester code is currently applicable. The 9 ms windows are staggered by time intervals approximately equal to half the bit-length divided by the number m of coherent integration PreD windows, e.g. ~10/m ms for Glonass. A final result is obtained by using the hypothesis search embodiment to combine such multiple-staggered integrations of correlations spaced apart (e.g. 75 Hz) in frequency to find a composite peak, and to report such composite peak as corresponding to a Doppler frequency halfway between. The results of the staggered coherent integrations are non-coherently combined to produce an output stream of non-coherently accumulated samples. When the processor block 320 sums up these staggered parallel PreDs non-coherently, a result or output is formed in which the overall SNR and Sensitivity are improved relative to a conventional single PreD. This process of staggered parallel preDs and non-coherent combining (signified by + or +) is repeatedly performed across the dwell, as indicated and illustrated in FIG. 13A by about twice as many slanted drawing lines visually delimiting successive trios (PreD1, PreD2, PreD3) or groups of staggered nine millisecond (9 ms) PreDs and the groups successively repeated across the dwell.

In FIG. 14, a sensitivity improvement on the order of even 0.5 to 1 dB is significant, and various embodiments can provide at least that much. For example, a disclosed embodiment herein confers a sensitivity gain of about 1.0 dB for five (5) staggered coherent integrations such as for GPS. Moreover, for the Manchester-coded Glonass the combined search process embodiment on frequencies+/−37.5 Hz can add additional sensitivity gain for Glonass as described earlier hereinabove. Some other embodiments can apply staggered coherent integrations for other PreD values. Different embodiments enable improved pilot SV sensitivity margin for 3GPP tests and operator/service provider tests.

Figure 13B:
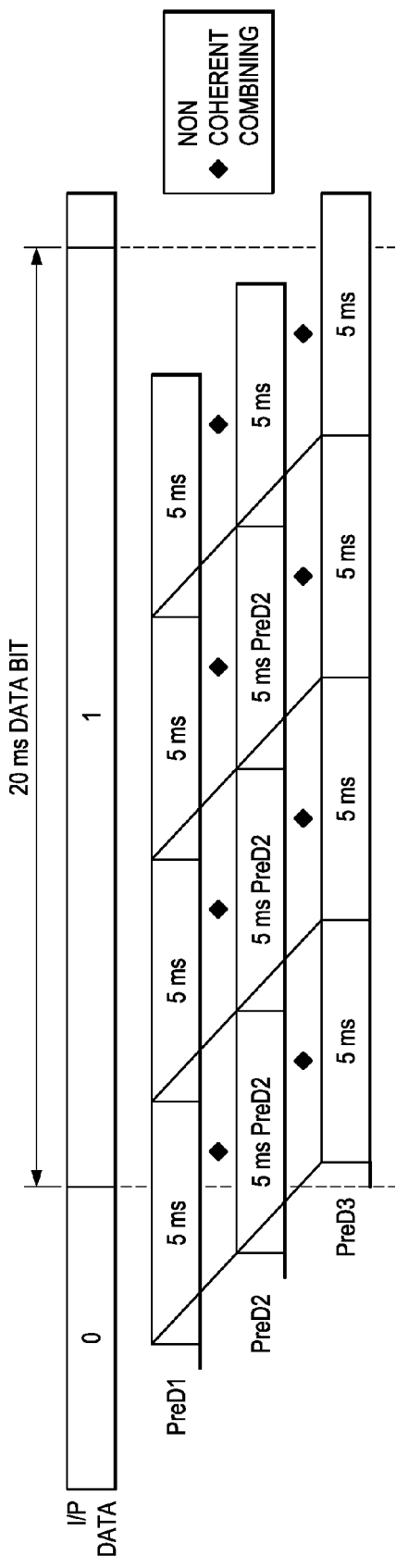
FIG. 13B is a composite diagram showing a simplified depiction of a data bit having an initially-unknown bit edge of FIGS. 3A-3C from a GNSS satellite, and further showing an embodiment established in the system of FIG. 5 wherein the embodiment concurrently employs three data windows for 5 ms coherent integration staggered with respect to each other approximately equally over the 5 ms window width.
Figure 13C:
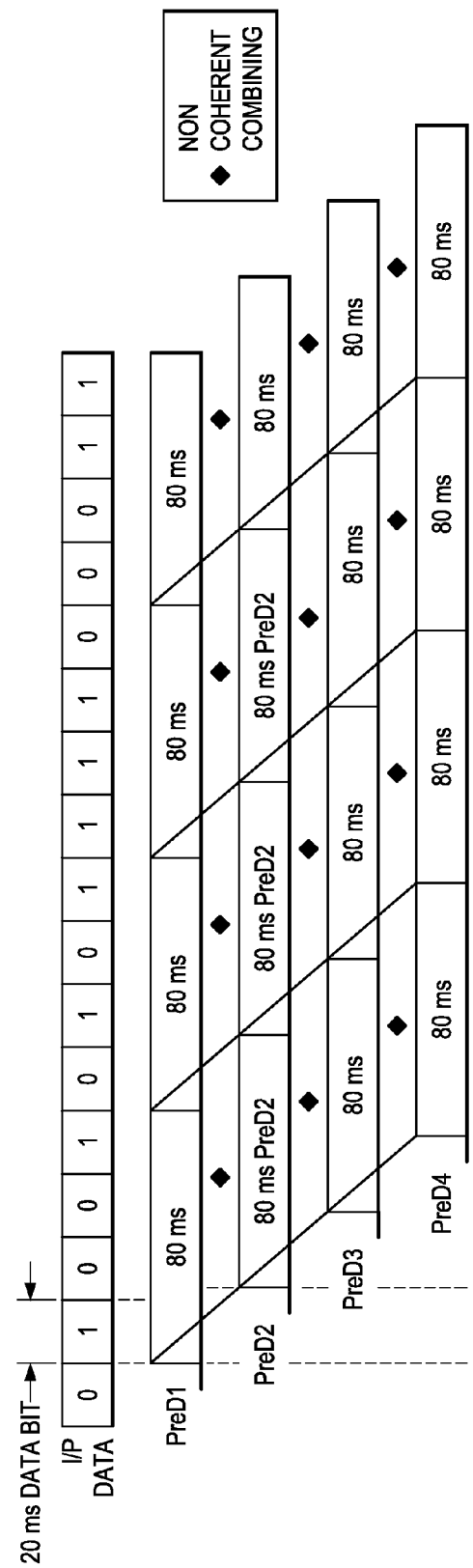
FIG. 13C is a composite diagram showing a simplified depiction of known 20 ms data bits having a known bit edge of FIGS. 3A-3C from a GNSS satellite, and further showing an embodiment established in the system of FIG. 5 wherein the embodiment concurrently employs four data windows for 80 ms coherent integration staggered with respect to each other approximately equally over the 80 ms window width.
Figure 13D:
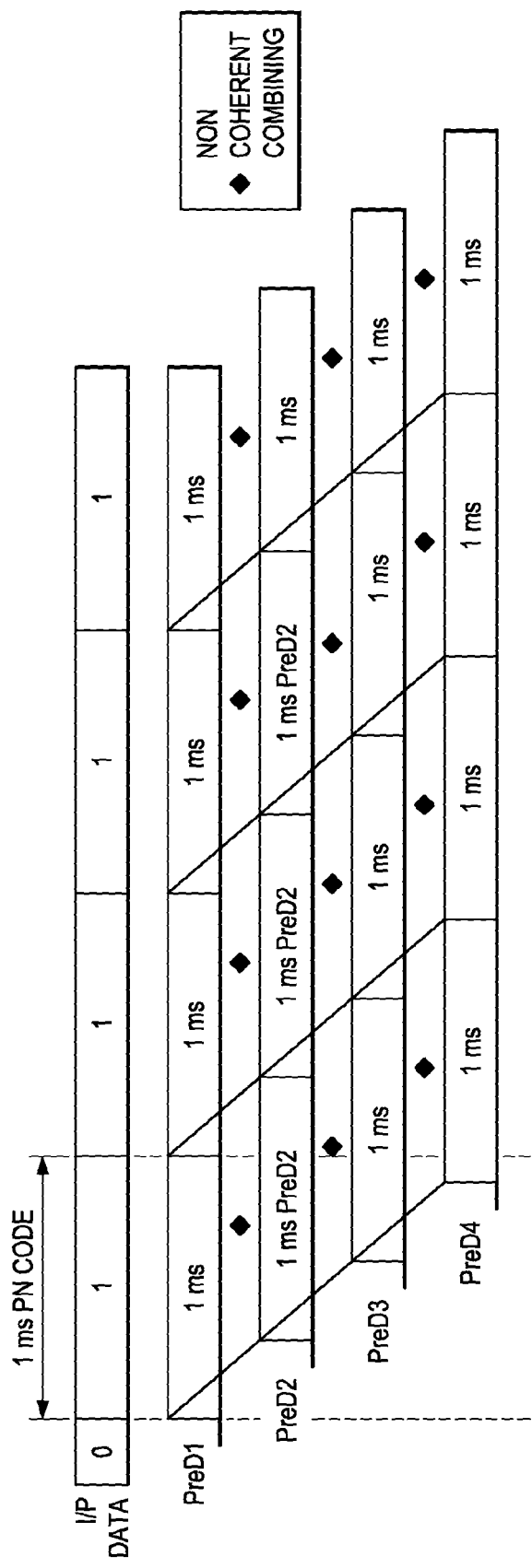
FIG. 13D is a composite diagram showing a simplified depiction of a data bit having an initially-unknown bit edge of FIGS. 3A-3C from a GNSS satellite, and further showing an embodiment established in the system of FIG. 5 wherein the embodiment concurrently employs four data windows for 1 ms coherent integration staggered with respect to each other approximately equally over the 1 ms window width.

In FIGS. 13B-13D, further combination structure/process embodiments are provided for numerous scenarios of staggered multiple windows, and FIGS. 13-13D illustrate how they work. Notice how FIGS. 13-13D also show that these process and structure embodiments with staggered multiple windows staggering are beneficially useful either for asynchronous or synchronous modes of operation in a satellite receiver, and indeed for asynchronous and/or synchronous communications and networks generally.

In FIG. 13B, an embodiment utilizes multiple staggered windows to accumulate the incoming signal and partially cancel noise over a PreD coherent integration interval (e.g., 5 ms) that is less than the 20 ms data bit period and not co-prime with 20 ms. In the illustrated example, three 5 ms windows are initiated at times relative to a first one of the windows of 0 ms, 1.67 ms, and 3.33 ms. More generally, one way of spacing the windows for FIG. 13B sets their length equal to the configured PreD and less than a data bit period, and establishes their spacings at stagger intervals of Pred/m, where m is a configured number of staggered windows. The instants of initiating each of the m staggered windows are at times 0, Pred/m, Pred*(2/m), ... Pred*(m−1)/m relative to a first one of such windows. Indeed, the exact positions of the windows are not even critical relative to each other. The window lengths may even differ from each other in some embodiments. The window positions can be independent of the data bit edge, and this embodiment can be applied prior to any determination of the data bit edge.

In FIG. 13C, an embodiment utilizes multiple staggered windows to accumulate the incoming signal and partially cancel noise over any desirably-long PreD coherent integration interval (e.g., 80 ms) exceeding the 20 ms data bit period. In the illustrated example, four 80 ms windows are initiated from the beginning bit edge of four consecutive bits at times 0 ms, 20 ms, 40 ms, 60 ms relative to a first one of the windows. More generally, one way of spacing the windows for FIG. 13C sets their length equal to the configured PreD, and establishes their spacings at stagger intervals of Pred/m, where m is a configured number of staggered windows and each stagger interval PreD/m is suitably equal to an integer number of window periods (one or more). The instants of initiating each of the m staggered windows are at times 0, Pred/m, Pred*(2/m), ... Pred*(m−1)/m relative to a first one of such windows.

This FIG. 13C embodiment is applicable for use in the receiver operations during such intervals when the sequence of bits is known. The receiver has prior information of at least some of the data bits, such as when the sequence of bits has been decoded by the receiver in the past or been injected into the receiver from an external source. For example, an assisted-GNSS system can provide and update known sequences of bits. This embodiment suitably correlates the applicable locally-generated Gold code with the incoming signal r(t) from a satellite as described elsewhere herein. A receiver circuit flips the sign of the locally generated code (or not) depending on whether the sign of the known bit from the assisted-GNSS data. That way, acquisition and tracking of even very-weak satellite signals is improved.

The embodiment of FIG. 13C is also applicable to even non-assisted receiver embodiments based on pre-existing knowledge of the data structure of satellite transmissions of particular GNSS systems. For example, GPS repeats some data every 12.5 minutes. Suppose a satellite is acquired when its signal is moderately strong, whence tracking commences, and then the satellite signal becomes weaker, either progressively depending on satellite position or temporarily depending on local reception conditions and physical geometry of an urban or natural environment. Data that is received when the satellite signal is less weak, and which is data that is known to repeat subsequently, constitutes known data for use by this long-PreD multiple staggered windows receiver and process. Furthermore, where the GNSS system transmits a known pilot code, as in Galileo, or transmits a long series of identical bits, acquisition and tracking are facilitated by this type of long-PreD multiple staggered windows embodiment even without terrestrial assisted-GNSS information.

A coarse time-assisted embodiment may sensitively detect satellite signals before the bit edge timing is ascertained. It may then switch to bit-synchronized integration upon ascertaining the bit edge timing. A more-granular (fine) time-assisted embodiment may have locally-available data by which or from which the code lag is known within, e.g., 30 microseconds (~34 chips or ~1/33 ms) prior to satellite acquisition.

FIG. 13D shows a multiple staggered-windows embodiment that utilizes a very short coherent integration interval PreD, e.g. 1 ms, where Pred is expressed in units of milliseconds. The coherent integration windows are e.g., each equal in width to an integer number (one or more) of PN code periods. The coherent integration windows are staggered relative to a PN code period of 1 ms or otherwise relative to a window width. In the illustrated example, four 1 ms windows are initiated at times relative to a first one of the windows of 0 ms, 0.25 ms, 0.50 ms, and 0.75 ms. More generally, for FIG. 13D, configuration sets their length equal to the configured PreD; and a way of spacing the windows configures their spacings at particular integer chips instants and staggered at chips intervals of approximately 1023*Pred/m, where m is a configured number of staggered windows. The instants of initiating each of the m staggered windows are at chipping times equal to first-integer-less-than-or-equal-to 0, 1023*Pred/m, 1023*Pred*(2/m), . . . 1023*Pred*(m−1)/m relative to a first one of such windows. The exact positions of the windows in integer chips are not critical relative to each other as long as the noises they encompass are relatively uncorrelated and can be partially cancelled across the windows. The window lengths may even differ somewhat from each other in some embodiments; each PreD e.g. PreD1=1 ms, 1 ms, 1 ms, etc. but could be Pred1=Pred3=1 ms, 2 ms, 1 ms, 2 ms, etc while PreD2=Pred4=2 ms, 1 ms, 2 ms, 1 ms, etc. This FIG. 13D embodiment can be applied without knowledge of the exact 1 ms PN-code edge and prior to any determination of the data bit edge.

In FIG. 13D, a correlation formula for chip-sums $$\sum_i r(i)g(i)$$

can be accumulated for windows respectively starting at e.g. 0, 256, 512, 768 chips or (m−1) integer-chips spacing intervals about 1022/m relative to each other for m staggered windows. This embodiment, suitably operates by non-coherently combining the results of repeated coherent integrations in the PreD windows over extended durations in which PN (Gold) code g(i) repeats each 1 ms no matter with which chip each correlation starts on. The duration can be set as long as the Gold code continues to repeat itself (or any bit-flipping is known). That way, the windows can be staggered and still build up a correlation peak at same code lag c for each window.

Figure 15:
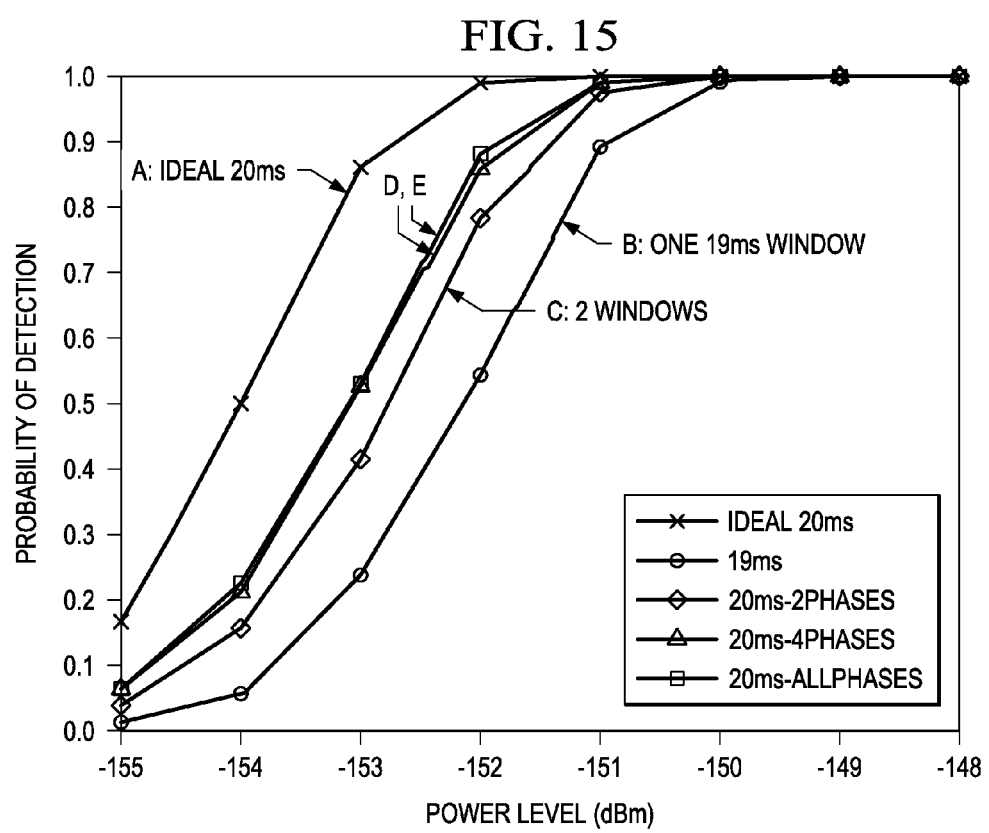
FIG. 15 is a graph of probability of detection versus satellite vehicle (SV) power (dBm), and having respective plots to compare various embodiments as in FIG. 13 but having two to five staggered windows ("phases") with each other and with conventional single-window PreD=19 ms for GPS, the plots showing sensitivity improvement increasing with the number of staggered windows.

In FIG. 15, Monte Carlo simulations of reception for a dwell are run independently multiple times (e.g., Ndwells=100) to compare the detection sensitivity for a conventional single Pred of 19 ms with the detection sensitivity for embodiments using two (2), four (4), or five (5) staggered coherent integration windows with PreDs each of 19 ms. With five (5) staggered coherent integration windows with PreDs each of 19 ms, the 19 ms windows are shifted with respect to each other by e.g. four milliseconds and combined non-coherently. Results show that the embodiments with four or five staggered windows each give a sensitivity gain of about 0.9-1.0 dB. And even with only two staggered windows, the sensitivity gain is about 0.6 dB. The 1.0 dB performance improvement is very significant in GPS context, where every 0.5 dB is a key care-about, and the 0.6 dB embodiment with but one additional window also provides quite useful and even more economical results. This type of process embodiment can be applied in other GNSS systems like Glonass as FIG. 13A. Moreover, this process embodiment can be implemented without any memory area addition. No extra memory need be employed compared to a pre-existing satellite acquisition system, since all the results are or can be non-coherently added to the same memory.

In FIG. 15, relative performance for different numbers of staggered integrations are graphed and results summarized below:
A) PreD=20 ms as if bit-edge information were known: Ideal
B) Conventional single window with PreD=19 ms suffers loss of 1.8 dB in sensitivity with respect to Ideal.
C) Two staggered coherent integrations time-shifted by 10 ms each—Loss of 1.2 dB in sensitivity with respect to Ideal (i.e., 0.6 dB better than (B)).
D) Four staggered coherent integrations time-shifted by 5 ms each—Loss of 0.9 dB in sensitivity with respect to Ideal (i.e., 0.9 dB better than (B)).
E) 20 staggered coherent integrations time-shifted by 1 ms each—Loss of 0.9 dB in sensitivity with respect to Ideal (i.e., same as (D); 0.9 dB better than (B)).

Beyond four staggered coherent integrations (D), diminishing returns occur as expected.

Some of the relevant equations are expressed next. Let 'A' of Equation (4A) be the signal amplitude of the received Rx Signal after 10 ms of coherent accumulation. Let N(k) be the corresponding complex AWGN (additive white Gaussian noise, complex in-phase and quadrature independently-generated random numbers) samples for that 10 ms. The equations assume an overall period of 16 seconds of integration. This is an example of a long dwell executed by the receiver when detecting signal at sensitivity levels.

$$r(k)=A+N(k) \text{ if signal is present} \qquad (4A)$$

$$r(k)=N(k) \text{ if only noise is present} \qquad (4B)$$

Equation (5) 'legacy_metric' assumes an overall period of 1600*10 ms=16 seconds of integration for a dwell where PreD=20 ms and PostD=800. PreD is 20 ms because the two 10 ms coherent integrations are coherently added before determining their magnitude, i.e. absolute value. Then the non-coherent integration adds up 800 magnitudes for the 800 bits in the 16 second dwell.

$$\text{legacy\_metric} = \text{abs}(r(1)+r(2)) + \text{abs}(r(3)+r(4)) + \ldots + \qquad (5)$$
$$\text{abs}(r(1599)+r(1600))$$
$$= \sum_{i=1}^{800} |r(2i-1)+r(2i)|$$

Equation (6) 'new_metric' again assumes an overall period of 1600*10 ms=16 seconds of integration for a dwell except this case has two different 20 ms coherent integration windows. The first window is PreD1=20 ms and has two coherently added terms [r(2i−1)+r(2i)]. The second window is Pred2=20 ms and has two coherently added terms staggered by 10 ms from the first window and expressed by [r(2i)+r(2i+1)]. This is an example using just two windows for simplicity and recognizing that in actuality the bit edge is unknown. PostD=800. Then the non-coherent integration adds up 800 magnitudes for each of the two windows Pred1 and Pred2 that each represents an attempt to align to the 800 bits in the 16 second dwell. The example operates as if window Pred1 were more successful in aligning and Pred2 were less successful. Remarkably and advantageously, whichever window is the better-aligned window contributes more to Sensitivity and SNR than the other even without knowing the position of the bit edge. And if each window is equally mis-aligned with a bit, that misalignment is better than the worst misalignment that could occur. Therefore, the average alignment over the dwell for this process embodiment New_Metric can be expected to outperform the single-window legacy_metric. The additional summands deliver a Sensitivity and SNR improvement that readily justify the acceptably-added processing due to the last summation $$\sum_{i=1}^{799} |r(2i) + r(2i+1)|$$

in Equation (6).

$$\begin{aligned} \text{New\_Metric} &= \text{abs}(r(1) + r(2)) + \text{abs}(r(2) + r(3)) + \\ &\quad \text{abs}(r(3) + r(4)) + \ldots + \\ &\quad \text{abs}(r(1599) + r(1600)) \\ &= \sum_{i=1}^{1600} |r(i-1) + r(i)| \\ &= \left\{ \sum_{i=1}^{800} |r(2i-1) + r(2i)| + \sum_{i=1}^{799} |r(2i) + r(2i+1)| \right\} \end{aligned} \quad (6)$$

For the higher numbers Nw of staggered windows, Equation (6) is suitably generalized. This example represents a special case but nevertheless shows and suggests how more general SNR advantage happens in general due to staggering and not related to bit edges. Another expression could represent a case when bit edges are unknown and use any of various PreD values.

For simplicity, the effects of the bit edge for the various co-prime PreD cases are not fully considered in the above Equation (6) or the attached code, which can be adapted for such cases. Nevertheless, Equation (6) provides an important scenario and insight into the operation of a process embodiment. Example code of TABLE 1 can be run to further show some of the benefits and for human understanding.

Basically, the procedure computes the Equation (5) legacy_metric for A+N(k) assuming signal is present at a given SNR per PreD window width, and then re-computes the legacy_metric for N(k) for noise-only. A first detection metric for each dwell is then computed as the z-score, which is the departure or difference of the legacy_metric minus the mean of the noise that was included when generating the legacy_metric, that difference divided by the standard deviation of that noise. Then the procedure computes the Equation (6) New_Metric for A+N(k) again assuming signal is present at the given SNR per PreD window width, and then re-computes the New_Metric for N(k) for noise-only. A second detection metric for each dwell is then computed as its z-score, i.e., the difference of the New_Metric minus the mean of the noise that was included when generating the New_Metric, that difference divided by the standard deviation of that latter noise. For the one hundred dwells, the z-scores of each metric are distributed in an approximately bell-shaped curve centered on 20*log 10(DetMetric/eps) in terms of dB with respect to a reference voltage "eps." Their cumulative distribution function (CDF) is plotted in FIG. 15 as S-shaped curves of Probability of Detection vs. Power Level dBm. The first and second detection metrics are particular cases that are processed to generate their respective CDFs that show up as the two particular S-shaped curves for 19 ms (Conventional) and for the two-window case legended "20 ms-2phases" in FIG. 15.

The CDF as a function of power level is the number (divided by Ndwell=100) of the z-scores below a given maximum z-score that corresponds to each given power level. The CDF value is interpreted as or corresponds to the probability of detection, assuming that the signal is detected as +1 when the z-score exceeds zero and detected as −1 when the z-score is less than zero. Put another way, presence of a signal level added to the noise adds to every z-score and increases the probability (CDF) of correctly detecting the signal. Thus, in FIG. 15, at −152 dBm, the probability of detecting the signal is about ½ (50%) using one 19 ms window, but with an embodiment with two staggered windows it jumps to almost 80%, and with more staggered windows approaches 90%. Accordingly, various embodiments can increase the probability of detection very substantially. With the Ideal 20 ms window, the probability of detecting the signal is about 98%.

TABLE 1

STAGGERING COHERENT INTEGRATIONS THEN ACCUMULATING

```
%%% Sample Code aimed at showing the benefit of staggering coherent integration
%%% periods and accumulating noncoherent outputs when trying to detect weak signals
CohSNR_dB = −7;           %%% coherent SNR per 10ms
Amp      = sqrt(2)*10^(CohSNR_dB/20); %%% Noi RMS of is sqrt(2)
NDwells  = 100;
for dwell_idx = 1:NDwells,
    %%%% Create Signal Plus Noise and Noise Only
    RxSig    = Amp+randn(1,1600)+sqrt(−1)*randn(1,1600);
    NoiSig   = randn(1,1600)+sqrt(−1)*randn(1,1600);
    %%%% Legacy Method
    SigNonCoh1(dwell_idx) = sum(abs(sum(reshape(RxSig,2,800))));
    NoiNonCoh1(dwell_idx) = sum(abs(sum(reshape(NoiSig,2,800))));
    %%%% New Method of staggered coherent periods and accumulating
        %%%%% first phase is same as legacy method
        SigNonCoh2(dwell_idx) = SigNonCoh1(dwell_idx);
        %%%%% Add the non-coherent results from staggered phase
        SigNonCoh2(dwell_idx)      =      SigNonCoh2(dwell_idx)+sum(abs(sum(reshape(RxSig(2:end−
1),2,799))));
    %%%% Repeat the above steps for pure noise only
        NoiNonCoh2(dwell_idx) = NoiNonCoh1(dwell_idx);
        NoiNonCoh2(dwell_idx)      =      NoiNonCoh2(dwell_idx)+sum(abs(sum(reshape(NoiSig(2:end−
1),2,799))));
    end
DetMetric1 = (SigNonCoh1-mean(NoiNonCoh1))/std(NoiNonCoh1);
DetMetric2 = (SigNonCoh2-mean(NoiNonCoh2))/std(NoiNonCoh2);
DetMetric1dB = 20*log10(max(DetMetric1,eps));
DetMetric2dB = 20*log10(max(DetMetric2,eps));
%%%%% plot the results
figure(1);hold off;
```

TABLE 1-continued

STAGGERING COHERENT INTEGRATIONS THEN ACCUMULATING

```
plot(sort(DetMetric1dB),[1:length(DetMetric1dB)]/length(DetMetric1dB),'rx-');
hold on;
plot(sort(DetMetric2dB),[1:length(DetMetric2dB)]/length(DetMetric2dB),'gx-');
grid on;
legend('Legacy Method','New Method','location','best');
xlabel('Detection Metric(dB) ->');
title('CCDF of Detection Metric','fontsize',12);
```

A GNSS receiver embodiment is suitably tested to determine that the disclosed embodiments of structure and process are present and activated and that its performance level is as expected. Test process embodiments are described as follows:

Test Process Embodiment 1

Input to the receiver an artificial lab-generated GNSS signal lacking the Manchester coding. Since the Manchester coding (meander sequence) is absent, a single peak in the frequency domain should or will result. The receiver, when operating to process a meander sequence on the premise that such meander sequence is present, combines that main peak and the noise ~75 Hz apart and incorrectly reports a Doppler frequency which is halfway between the two, i.e., around 37 Hz off from the main peak location. On enabling or introducing the Manchester coding into the input signal, the receiver should start reporting the correct Doppler frequency as expected. Also, signal-to-noise ratio SNR reported by the receiver will be worse (diminished) when the Manchester coding is artificially disabled.

Test Process Embodiment 2

Test 2A. Input a synthesized GPS signal to the receiver without any data bit transitions and having the noise correlated (or even identical) with each 20 ms data bit period. Inject a noisy GPS signal such that the first 10 ms of noise is the same as the next 10 ms. The latter can be generated in the lab conveniently and played back at RF into the receiver under test. Monitor the change in receiver sensitivity for the above signal versus the usual GPS signal that is accompanied by additive white Gaussian noise (AWGN). The difference in sensitivity is used to detect proper operation of a receiver embodiment or departure from proper operation of the receiver under test. A receiver without the expected operation will see a de-sense of 3 dB (three decibels) in sensitivity while using a PreD of 20 ms, due to the correlated nature of the artificial test noise compared to the sensitivity to a signal with AWGN. By contrast, a properly-operating receiver embodiment will see a much lower or negligible de-sense value.

In Test 2A, in other words, a FIG. 13 receiver, in the first case of merely-repeated noise in 10 ms halves of each bit period, has at least one or another of its multiple staggered 19 ms windows straddling part of each of the 10 ms halves, so that the coherent integration of the noise in one or another staggered window partially cancels consistently as a whole using the multiple staggered windows together over the dwell. By contrast, a conventional receiver with a single 19 ms window experiences far less consistent opportunities for such partial cancellation, and consequently is expected to be de-sensed by about 3 dB. This type of lab test embodiment indirectly and conveniently provides an indication that the operations in a receiver embodiment using multiple staggered windows are active and successful.

Test 2B. Further in Test Process Embodiment 2, couple digital samples from the front end of the receiver under test (RUT) to a properly-performing comparison receiver (CR) with configurable single window or configurably-multiple staggered windows. Adjust the configured number of windows of the comparison receiver CR to most nearly match the performance of the receiver RUT, analogous to FIG. 15. For a known RUT configuration and architecture same as CR, the number of windows configured to be active in the RUT should equal the configured number of active windows in the CR when CR is delivering comparable performance to the RUT. However, if the RUT has e.g. four (4) staggered windows configured to be active but performs comparable to such a CR configured e.g. with only one window active, then the RUT fails the test. In another example, suppose CR is configured with four staggered windows active and an unknown RUT performs essentially the same or as well as the CR. Then the RUT is inferred to be, and quite likely is, utilizing at least some staggered windows and their operations are active.

Embodiments of applications and system blocks disclosed herein are suitably implemented in fixed, portable, mobile, automotive, water- or sea-borne, and airborne, communications, control, set top box, television (receiver or two-way TV), PC and other apparatus. A personal computer (PC) is suitably implemented in any form factor such as desktop, laptop, palmtop, organizer, mobile phone handset, PDA personal digital assistant, internet appliance, wearable computer, content player, personal area network, or other type and usable with media such as optical disk, flash drive, and other media.

Figure 16:
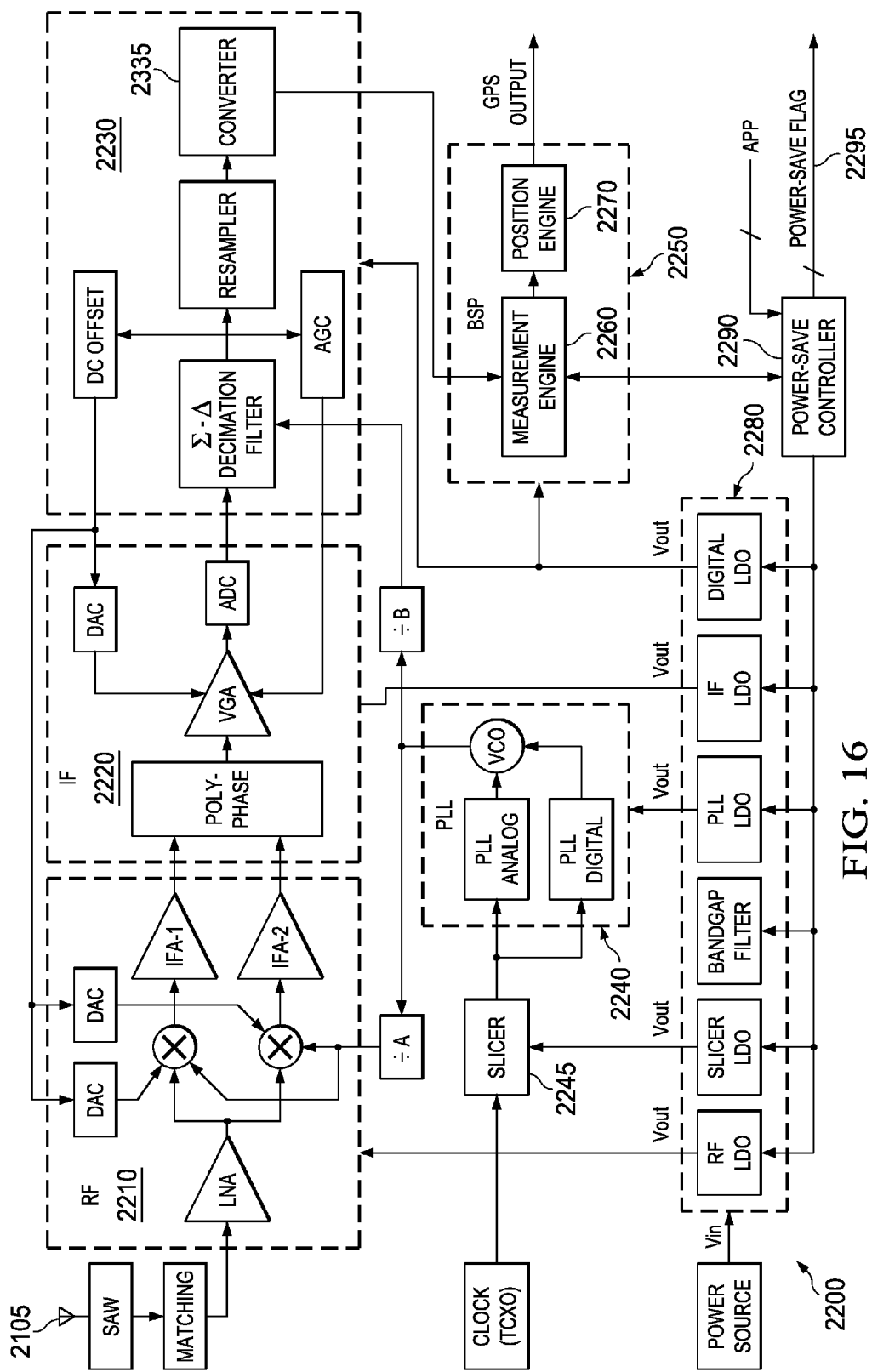
FIG. 16 is a block diagram for an embodiment with a front end and power management circuitry and receiver engine structures and processes as detailed in the Figures herein.

FIG. 16 shows a GPS receiver 2200 embodiment including a BSP 2250 having a Measurement Engine 2260 feeding a Position Engine 2270. Position Engine 2270 refers to functions of or operations in the Baseband processor BSP that are run on a host processor and/or on a dedicated microprocessor and Position Engine 2270 supplies GPS output. Measurement Engine 2260 is coupled to and fed by a Digital Front-end 2230. Measurement Engine 2260 includes structures, functions or operations of the GPS chip such as in FIG. 5. A power-save controller 2290 controls a voltage supply 2280 for five main blocks: RF 2210, IF 2220, Digital Front-end 2230, PLL 2240 fed by a clock circuit having a temperature compensated crystal oscillator TCXO as time base via a power controlled clock slicer 2245, and BSP 2250. Voltage supply 2280 supplies and regulates power voltage to the power gating circuitry (e.g., gating FETs in the supply voltage lines to power managed blocks) controlled by Power-Save Controller 2290. The front end 2230 and power management circuitry 2280, 2290 support the other receiver structures and processes detailed in the Figures herein by supplying signals and saving power and energy.

The power-save controller 2290 is connected directly to any of the other individual components to turn them on/off directly as shown by a connection from the power-save controller 2290 to the Measurement Engine 2260, for instance.

Power connections and/or power controlling enables are provided to any appropriate block or components in each block of FIGS. 2, 5, and 16-18 whether or not explicitly or completely shown therein. Power-save controller 2290 is coupled by Digital LDO, or otherwise, to the power source in a way that keeps some or all of power-save controller 2290 operable and active to deliver power control duty cycles and power control enable and disable signals to power-controlled blocks of receiver 2200.

Figures 17, 17A:
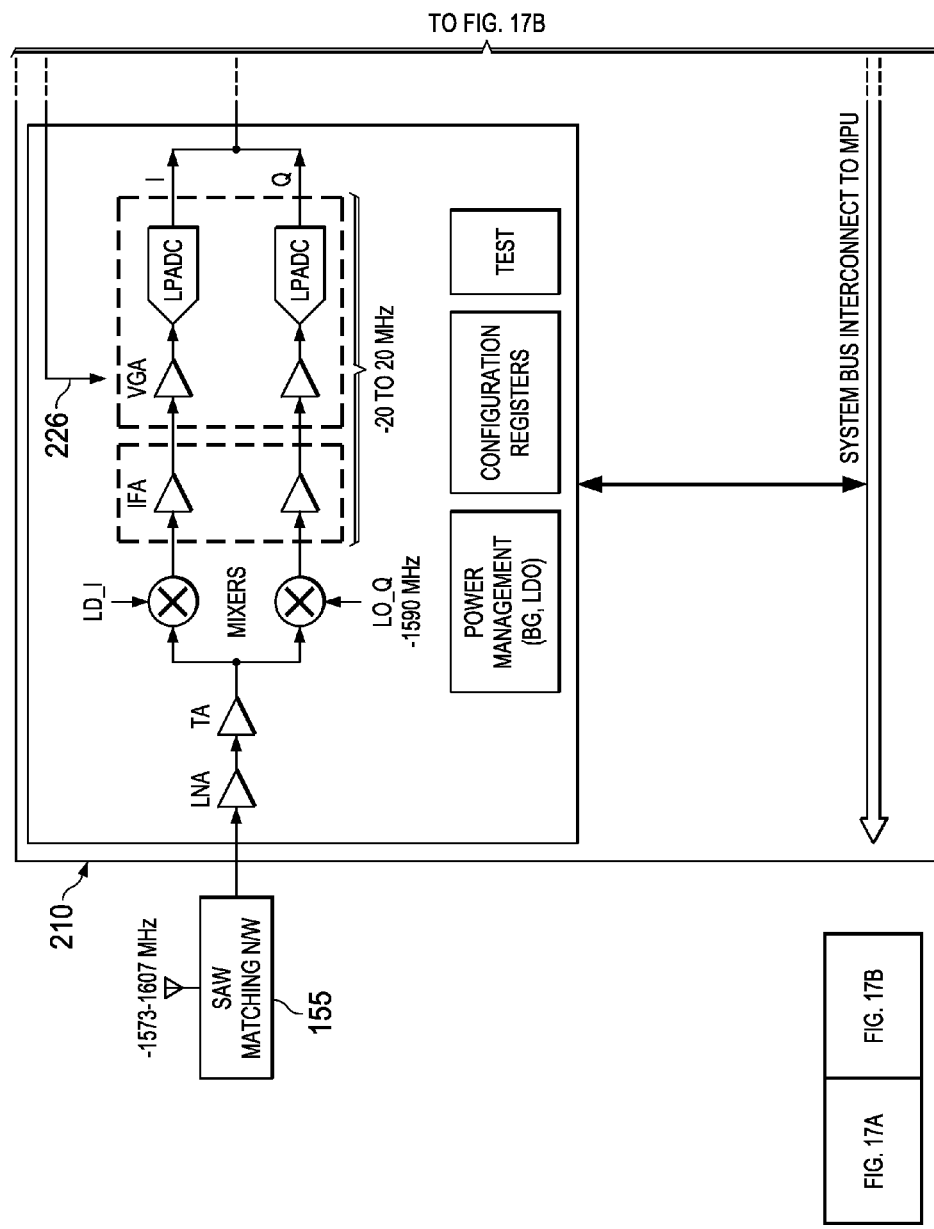
FIGS. 17A and 17B are two parts of a composite block diagram Figure, where FIG. 17A generally shows an analog front end
Figure 18:
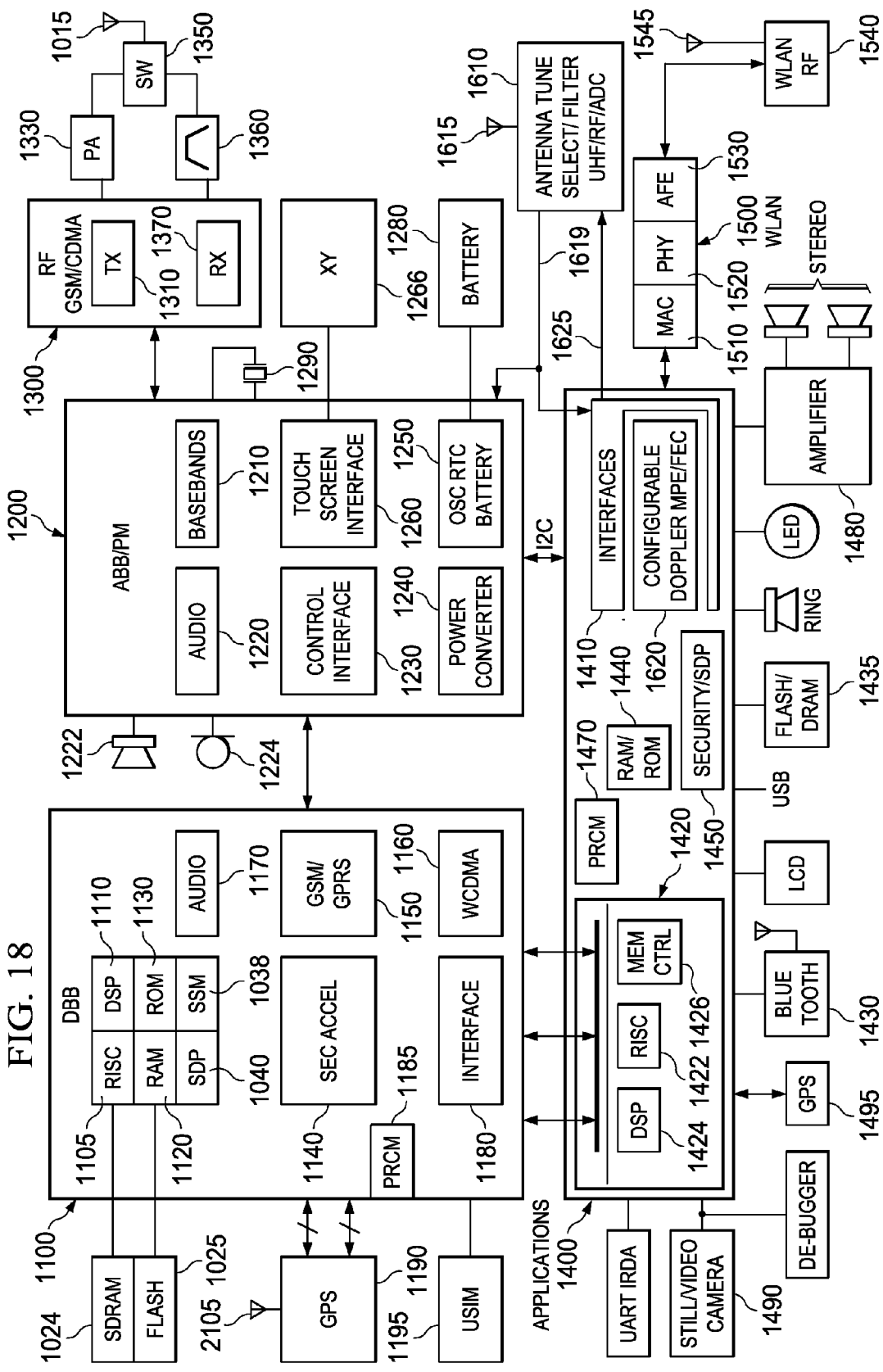
FIG. 18 is a block diagram of circuit blocks of a cellular telephone handset embodiment for GNSS or assisted GNSS for use with a positioning receiver of the other Figures herein.

For conciseness here, and to the extent not otherwise described herein, the various numerals and description in FIGS. 16-18 parallel the description of corresponding Figures in said incorporated US Patent Application Publication 20090168843 dated Jul. 2, 2009, "Power-Saving Receiver Circuits, Systems and Processes," and/or said incorporated US Patent Application Publication 20120026039, dated Feb. 2, 2012, "A Single RF Receiver Chain Architecture for GPS, Galileo and Glonass Navigation Systems, and Other Circuits, Systems and Processes," and/or said incorporated US Patent Application Publication 20110103432, dated May 5, 2011, "Enhanced Cross Correlation Detection or Mitigation Circuits, Processes, Devices, Receivers and Systems," and are used in a communications system as described therein.

Figure 17B:
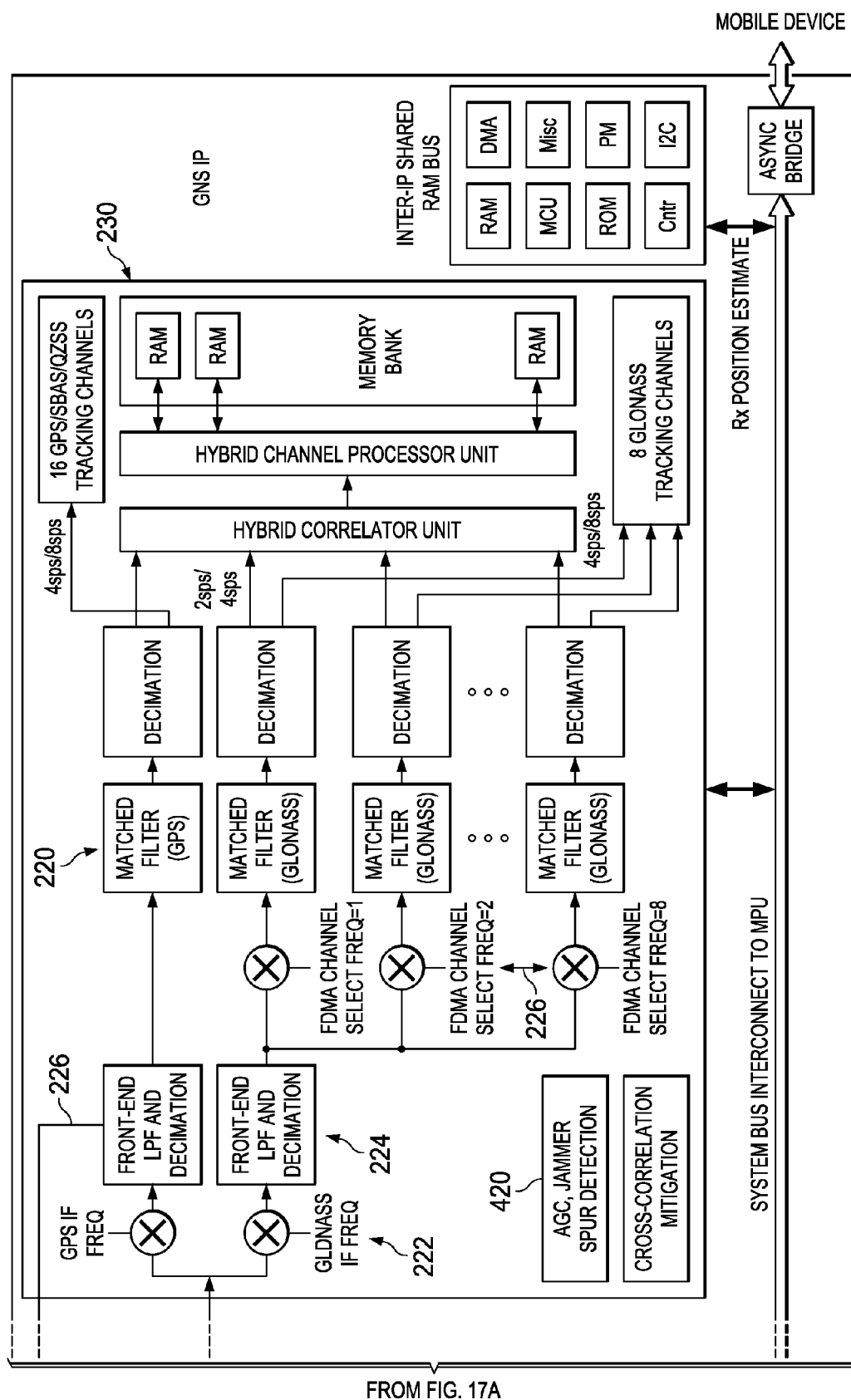

Turning to FIGS. 17A-17B, and for some background on a receiver architecture for GPS, Galileo and Glonass, see US Patent Application Publication 20120026039, dated Feb. 2, 2012, "A Single RF Receiver Chain Architecture for GPS, Galileo and Glonass Navigation Systems, and Other Circuits, Systems and Processes," which is hereby incorporated by reference herein in its entirety. In FIG. 17A, a single receive RF chain encompasses all of GPS, Galileo and Glonass at RF (~1573 MHz to ~1607 MHz) without significant image rejection with respect to heterodyning by a single LO situated in frequency (e.g., ~1590 MHz) between them, and followed by a single low power wide band IF (−20 MHz to +20 MHz) and LPADC encompassing all of GPS, Galileo and Glonass at IF, and further followed in FIG. 17B by software-based, hardware-based, or mixed digital signal processing 220-226 to separate GPS, Galileo and Glonass in the IF from each other. Subsequent processing demodulates the information in respective satellite signals from any selected one, two or all of the GNSS either in parallel or consecutively. The digital processing has three parts: a common (shared) digital part, a GPS-specific part and a Glonass-specific part. The common part includes AGC, DC offset and IQ mismatch calibration logic. The GPS-specific and Glonass-specific component of the filter chain includes decimation filters, de-rotator and resampler. When the receiver is programmed in GPS-only mode, then the common part and GPS-specific part are active; and the Glonass-specific part is suitably clock-gated to save power. When the receiver is programmed in Glonass-only mode, then the common part and Glonass-specific part are active; and the GPS-specific part is suitably clock-gated to save power. Remarkable improvements according to the other Figures herein (especially e.g. FIGS. 6-10, and FIGS. 13 and 13A) are suitably applied to the receiver of FIGS. 17A-17B, particularly in regard to the FIG. 17B hybrid correlator unit, hybrid channel processor unit, and the tracking channels units, which relate to the blocks in FIG. 5 that are described elsewhere herein.

Embodiments herein for satellite receivers are contemplated to receive and separate the above GNSS signals and other GNSS signals. Such other GNSS may include Beidou-2 (COMPASS, China) code-division satellite signals, IRNSS (Indian Regional Navigational Satellite System 1176 and 2492 MHz), QZSS (Quasi-Zenith Satellite System, Japan, related to GPS), as well as ground-based transmitters and other augmentations. Some augmentations are SBAS, e.g. satellite based augmentation systems like the North American WAAS Wide Area Augmentation, European Geostationary Navigation Overlay Service EGNOS, and Multi-Functional Satellite Augmentation System MSAS relating to east Asia. Also, some embodiments add a digital signal processing chain to receive COMPASS and are structured and operate in a manner analogous to the digital signal processing chains already described herein for each of Glonass and GPS/Galileo. Thus, various other embodiments for analogously and inexpensively processing plural-GNSS and other signals may have different frequency bands and ranges, different LO frequency, and different IF and ADC bandwidth than in the examples shown. It is emphasized that the "G" in GNSS is not limiting to only global systems.

Figure 1:
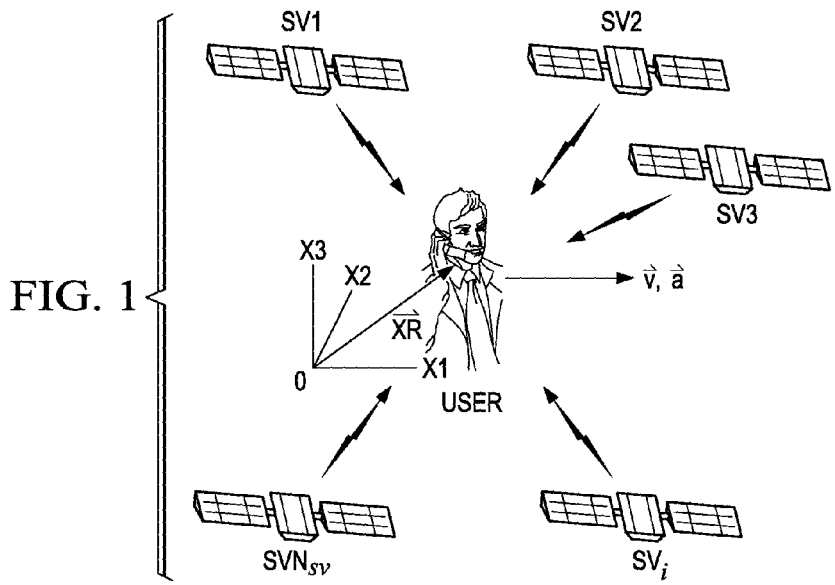
FIG. 1 is a pictorial diagram of a user with an inventive mobile device supported by a positioning system with satellite vehicles (SVs).

The description now provides some further detail regarding FIGS. 2, 4, 5, 7, and 16-18 and according to remarkable embodiments herein. The receiver 100 tracks four or more satellites (FIG. 1), which may be from different GNSS types, recovers the transmitted information from each of them, and operates a microprocessor or other solution block to act as a Position Engine (2270, FIG. 16) to solve navigation equations to yield the position $X_R$ of the receiver in FIG. 1 for user applications involving position on and above the surface of the earth. A simple example of navigation equations in three position coordinates x indexed i=1, 2, 3 that are simultaneously solved based on signals from satellites SVj (j=1, 2, 3, 4, ...) is given in rectangular coordinates by $$\sum_{i=1}^{3} (x_{ij} - x_{iR})^2 = c_L^2 ((t_{Rj} + e) - t_j)^2 \quad (7)$$

In words, Equation (7) says that the square of the distance from the satellite to the receiver is equal to the square of the product of the speed of light times the propagation time to traverse the distance. Parameters $x_{ij}$ represent each (known) coordinate position i of satellite j communicated by ephemeris data. Variables $x_{iR}$ represent each (unknown) coordinate position i of the receiver itself. Time $t_j$ is the time of transmission from satellite j received with the data signal and corresponding to receiver R local time $t_{Rj}$. The receiver local time has a bias error e relative to the atomic time base of the applicable GNSS system, so the GNSS time at the receiver is $t_{Rj}$+e. Speed of light cL times the GNSS time difference between transmission and reception is expressed by $c_L((t_{Rj}+e)-t_j)$ and equals the distance to the satellite j. Given enough information such as from four or more satellites, the navigation equations are solved for position coordinate unknowns $x_{iR}$ and unknown bias error e. In spherical coordinates, the three parameters $x_{ij}$ and the three variables $x_{iR}$ in the navigation equations are each replaced by a trio of expressions r cos θ cos φ, r cos θ sin φ, r sin θ appropriately subscripted and with a summation over the three coordinates explicitly written out.\

Figure 4:
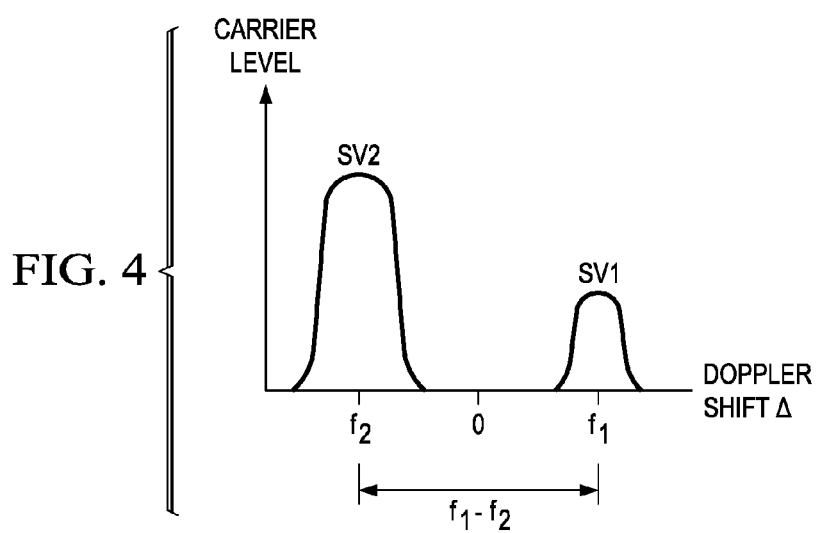
FIG. 4 is a hypothetical spectrum of signal level versus Doppler shift for each of two satellites.

In FIG. 4, the known carrier frequency from each satellite SV1, SV2, etc is, in general, Doppler shifted by a different amount f1, f2, etc. FIG. 4 shows a hypothetical spectrum of signal level versus Doppler shift for two satellites SV1 having a lower power signal, and SV2 having a high power signal. In FIG. 4, the Doppler shift $f_i$ for a given GPS SVi is the difference between the 1.575 GHz GPS system frequency (zero "0" in FIG. 4) nominally shared by all SVs and the actual carrier frequency of a particular SV carrier due to Doppler shift away from 1.575 GHz. Doppler shift is also caused by receiver R (100) clock offset. The signal null-to-null bandwidth is around 2 MHz whereas the Doppler difference is maximum of the order of 10 KHz. So the frequency spectrum for SV1 and the frequency spectrum for SV2 will overlap to a great extent in general (being spread-spectrum signals at RF), while from a correlation (120, 310) viewpoint FIG. 4 shows them as non-overlapping correlation peaks.

FIG. 5 shows a Search section 310 for performing intensive calculations to identify a new SV, and a Tracking section 330 for performing calculations to keep track of several already-identified SVs. A converter 335 feeds tapped delay lines 305 that go to a fast correlation engine 310 having a set of parallel Correlators (multiply-add channel filters) 310. Cross correlation mitigation hardware 400 supports both the Search and Tracking functions, see US Patent Application Publication 20110103432 May 5, 2011, "Enhanced Cross Correlation Detection or Mitigation Circuits, Processes, Devices, Receivers and Systems," which is hereby incorporated by reference herein in its entirety.

In FIGS. 2, 3B, 5, 6 and 7, the correlators in block 310 (120) each operate over a 1 ms characteristic PN sequence of a satellite such as SV1 or SV2 and multiply-add by a locally selected and generated PN sequence from the receiver's stored set of satellite-specific unique PN sequences to despread a spread-spectrum satellite signal. An hypothesis search engine block 220 (FIG. 7) repeatedly issues a different code lag value c and hypothesis frequency f to a PN code-issuing block 210 so that the receiver performs correlation at all the lags and accumulates the correlation outputs over multiple milliseconds to detect the signal. (Keep in mind that hypothesis frequency f is used differently for Glonass in FIGS. 5, 6 and FIG. 10 embodiments than for GPS f=fd (Doppler).) By the applicable hypothesis search embodiment for Glonass or for GPS respectively, a generated PN sequence is found that is properly time-shifted by a respective code lag c relative to the receiver time-base to synchronize with and produce a peak with the characteristic PN sequence received from the corresponding satellite SV1 or SV2. Hypothesis frequency removal (for Glonass) or Doppler frequency removal (such as for GPS and Galileo) for the SV1 to be identified is provided as a "wipe-off" in any appropriate way by block 210 in FIG. 7. One way pre-multiplies the collection r(t) of received signals (and noise) for the various SVs by the hypothesis frequency f1 function $\exp(j2\pi(-f1)(t+(n/1023)))$ and delivers for correlation with a Gold code P1 for SV1. Another alternative and equivalent way impresses hypothesis frequency by pre-multiplication by $\exp(j2\pi(f1)(t+(n/1023)))$ with the Gold code P1 for SV1 and delivers for correlation with the collection r(t) of received signals (and noise) for the various SVs.

In FIGS. 5 and 6, the Search section repeatedly operates numerous correlators 310 and Channel Processors 320 with parallelism where possible to hypothesis-search for a given satellite such as SV1. A corresponding number of Channel Processors 320 are provided to process the output of the correlators 310 as respectively described herein for Glonass or for GPS/Galileo, and identify a peak for a given satellite when a locally generated PN sequence is successfully despreaded by a correlator, and obtain GNSS information from acquired satellites.

In FIG. 6, an hypothesis search space suitably has two dimensions for Doppler and code lag (code phase) for use by the receiver structures and processes in FIGS. 5 and 7. The hypothesis search can be exhaustive of all possible Doppler shift f1 and code lag c, or can be suitably reduced to save time and energy using ephemeris data and/or assisted GPS data from a communications network. The search provides, e.g., numerous correlations each based on a respective given (hypothesized) pair of values of possible Doppler shift f1 and code lag c according to the summation (8) in each millisecond:

$$\sum_{n=0}^{1022} P1(n+c) * \exp(j2\pi(f1)(t+(n/1023))) * r(t) \quad (8)$$

For a GPS reception embodiment with multiple 19 ms windows staggered by 20/m milliseconds, Equation (8) is generalized and the electronic embodiment is represented by Equation (8.1), which represents a (non-coherent) sum of magnitudes (vertical bars '|x|') of 19 coherent accumulations of correlations over successive one-ms intervals. (Note that 20i/m is rounded to nearest integer. Also, the outer summation over index i assumes without limitation an odd number m of PreD windows, and if number m is even the process is adjusted e.g. to sum from i=1−m/2 up to m/2.) A further outer sum over a dwell is suitably applied to Equation (8.1) as well and omitted for conciseness from Equation (8.1), but see Equations (8E) and (8F).

$$\sum_{i=-(m-1)/2}^{(m-1)/2} \left\{ \left| \sum_{t=1}^{19} \sum_{n=0}^{1022} [P1(n+c) * \exp(j2\pi(f1)(t+20i/m + (n/1023))) * r(t)] \right| \right\} \quad (8.1)$$

In FIGS. 6 and 10 for a Glonass receiver embodiment, electronic processing represented by Equation (8) is remarkably modified herein, where f1 is a Doppler frequency and Fs is the Manchester rate of e.g. 50 Hz. For each code lag value c, two hypothesis frequencies are generated—one at (f1+kFs) and another at (f1−kFs), where k=0.75 and kFs is 37.5 Hz when Fs=50 Hz. In another embodiment, k=1.0 and kFs is 50 Hz when Fs=50 Hz. In each one-millisecond interval the correlations are given by Equations (8A) and (8B). Those respective correlations are coherently accumulated over an applicable PreD interval (e.g. 9 ms) and then non-coherently added as in Equation (8C).

$$\sum_{n=0}^{510} P1(n+c) * \exp(j2\pi(f1+kFs)(t+(n/511))) * r(t) \quad (8A)$$

$$\sum_{n=0}^{510} P1(n+c) * \exp(j2\pi(f1-kFs)(t+(n/511))) * r(t) \quad (8B)$$

$$\left| \sum_{t=1}^{9} \sum_{n=0}^{510} [P1(n+c) * \exp(j2\pi(f1+kFs)(t+(n/511))) * r(t)] \right| + \left| \sum_{t=1}^{9} \sum_{n=0}^{510} [P1(n+c) * \exp(j2\pi(f1-kFs)(t+(n/511))) * r(t)] \right| \quad (8C)$$

If two 9 ms windows staggered by 4 ms are used in a receiver embodiment for Glonass reception, they are represented for instance by Equation (8D), which can be straightforwardly generalized for more such windows, see Equation (8.1).

$$\left\{ \left| \sum_{t=1}^{9} \sum_{n=0}^{510} [P1(n+c) * \exp(j2\pi(f1+kFs)(t+(n/511))) * r(t)] \right| + \right.$$ (8D)

$$\left| \sum_{t=1}^{9} \sum_{n=0}^{510} [P1(n+c) * \exp(j2\pi(f1-kFs)(t+(n/511))) * r(t)] \right| \right\} +$$

$$\left\{ \left| \sum_{t=1}^{9} \sum_{n=0}^{510} [P1(n+c) * \exp(j2\pi(f1+kFs)(t+4+(n/511))) * r(t)] \right| + \left| \sum_{t=1}^{9} \sum_{n=0}^{510} [P1(n+c) * \exp(j2\pi(f1-kFs)(t+4+(n/511))) * r(t)] \right| \right\}$$

Another embodiment uses a number j=0, 1, 2, . . . PostD-1 of 18 ms integration windows of 9 ms de-spreading code followed by 9 ms negated de-spreading code as represented by Equation (8E) and noncoherently accumulates them over a dwell as indicated by the outer summation.

$$\sum_{j=0}^{PostD-1} \left\{ \left| \sum_{t=1+j}^{9+j} \sum_{n=0}^{510} [P1(n+c) * \exp(j2\pi f1(t+(n/511))) * r(t)] - \sum_{t=1+j}^{9+j} \sum_{n=0}^{510} [P1(n+c) * \exp(j2\pi f1(t+9+(n/511))) * r(t)] \right| \right\}$$ (8E)

Another receiver embodiment for Glonass reception uses two 18 ms windows staggered by 4 ms. They are represented for instance by Equation (8F), which can be straightforwardly generalized for more such windows, see Equation (8.1). The windows do not need to be of precisely equal length, so variants like (plus: 9 ms, minus: 10 ms); or (plus: 10 ms, minus 9 ms) are variant embodiments of Equations (8E) and (8F).

$$\sum_{j=0}^{PostD-1} \left\{ \left| \sum_{t=1+j}^{9+j} \sum_{n=0}^{510} [P1(n+c) * \exp(j2\pi f1(t+(n/511))) * r(t)] - \sum_{t=1+j}^{9+j} \sum_{n=0}^{510} [P1(n+c) * \exp(j2\pi f1(t+9+(n/511))) * r(t)] \right| + \left| \sum_{t=1+j}^{9+j} \sum_{n=0}^{510} [P1(n+c) * \exp(j2\pi f1(t+4+(n/511))) * r(t)] - \sum_{t=1+j}^{9+j} \sum_{n=0}^{510} [P1(n+c) * \exp(j2\pi f1(t+13+(n/511))) * r(t)] \right| \right\}$$ (8F)

It is emphasized that the Equations herein are illustrative and susceptible of numerous variations in embodiments for desired performances by ordinary exercise of engineering skill applied to or based on the teachings herein.

If SV1 is visible (receivable), received signal r(t) includes a Doppler-shifted Gold code P1(n+c1)*exp(-j2π(f1)t). Correlation performs a sum of products hereinabove which cancels or wipes off the Doppler and finds the code lag c1 of the received Gold code from SV1 for which the correlation (9) is greatest, i.e., at the correlation peak for SV1 as represented by any of summations (8)-(8F) when hypothesized code lag c equals the actual code lag c1 for SV1.

$$\sum_{n=0}^{1022} P1(n+c1) * P1(n+c)$$ (9)

In FIG. 4, peaks for a high-powered signal SV2 and a low powered signal SV1 are received. SV2 sends its satellite ID to the receiver, and the receiver 100 has pre-programmed information identifying the Gold code specific to that satellite ID. The receiver 100 thus performs a signal correlation in its correlator 120 fed from block 210 (FIG. 7) with an internally generated Gold code thus identified. The correlator 120 is also fed with the SV2 received PN code from front end 110. The code lag $c_j$ indicates the difference in receiver time between the time $t_{Rj}$ when the PN code was issued by block 210 and the satellite SVj time $t_j$ when the same PN code was issued, as expressed in Equations (10A) and (10B):

$$c_j = t_{Rj} - t_j$$ (10A)

$$c_j + e = (t_{Rj} + e) - t_j$$ (10B)

The time t position of the correlation peak is determined by the correlator 120 and provides vital positioning information because the beginning of each 1 ms PN sequence is locked in the satellite to the satellite time base that keeps time tj and in the receiver to the receiver timebase that keeps time $t_R$. Consequently, the code lag position of the autocorrelation peak at the receiver, which is the desired valid received peak for satellite SVj, is the position that is useful to establish true time $t_{Rj}$+e in the navigation equations (7). The beginning of each 1 ms PN local sequence (the receiver-provided PN sequence or Gold code) is locked to the receiver timebase, or search-shifted in the hypothesis search a known amount c relative to the receiver time base. The code lag value $c_j$ measured by hypothesis-searching with the FIG. 7 circuitry to find a peak from the correlator 120 amounts to the true time lag that the satellite signal takes to get to the receiver minus the bias e of the time base of the receiver 100 relative to the atomic time base of the system of satellites. Even if a satellite time value is only subsequently decoded from the data sent by the satellite after the valid received peak for that satellite is detected herein, the receiver time base can very accurately measure any time interval value needed to backtrack that satellite time value to, or otherwise provide, a value tj representing the same instant signified by a receiver time value $t_{Rj}$ for that instant. Then, using the positions of several autocorrelation peaks, such as from four or more satellites, the Position Engine 2270 not only obtains the receiver position ($x_{1R}$, $x_{2R}$, $x_{3R}$) but also the bias error e by solving the navigation equations (7). It should be understood that the above discussion relates to one example of many possible alternative GNSS approaches useful in various embodiments herein and helps point out that code lag is intimately related with time, signal propagation delay, and bias error.

In FIG. 5, de-spreaded modulation is coherently accumulated and dumped to memory 325 to increase the signal to noise ratio as discussed elsewhere herein. A block of memory 325 in FIG. 5 provides a number of memory sections for each of the Channel Processors 320 and for noncoherent summation results. In this way, the cumulated information from coherent and noncoherent summation is recorded and maintained. A hardware counter block 350 counts chips and/or cycles and together with blocks 375 and 380 keeps time $t_R$ for receiver 100. ("Chips" depending on the context means or is related to PN spreading sequence bits as in FIG. 3B, or to amount of code lag expressed in chips as a time unit, e.g. 1 chip=(1/1.023) microseconds. The meaning is thus distinct from that of chip as an integrated circuit chip.) Also, counter block 350 includes counters and registers and associated circuitry for configuring and establishing power management duty cycles in case those are desired.

Further in FIG. 5, the baseband converter 335 provides an output to a Tracking section that has a set of Tracking DLL channels 330 that in turn supply output to a DLL postprocessor 340. These channels are delay lock loop SV peak tracking channels to accommodate an at-least-adequate number of satellites for the receiving purposes. The Tracking section handles SV signals that have been successfully searched by the Search section. The Tracking section can also have its own correlators in Tracking DLL channels 330 that are optimized to deliver a smaller number of hypothesized pairs of values of possible Doppler shift f1 and code lag c1 to apply to the correlators in the Tracking section according to the summation Equations (8)-(8F). The DLLs compute or keep track of peaks to track the time delay or code lag c2 of the PN sequence for each given already-acquired low power SV1 signal and high power SV2 signal and in the process can track Doppler for each such SV. Frequency lock loop(s) (FLL) are also suitably provided to get a more accurate estimate of the Doppler frequency by locking onto each available Doppler shifted satellite carrier signal and determining Doppler shift D and time-differenced Doppler (delta-D) for each satellite that is acquired.

In a system aspect of FIG. 5, a system bus 360 couples the block 120 for Search/Tracking to a microprocessor MPU 370 and its associated memory RAM and ROM. The system also has a clock calibration block 375 including a reference time counter and a GPS/GNSS clock counter; and a time maintenance block 380, and a real-time clock counter 385. Communications peripherals 390 include first and second UARTs (parallel to serial interfaces also known as universal asynchronous receiver transmitter), a serial I2C interface and a sensor interface using serial I2C. The sensor interface suitably includes tilt sensors and/or accelerometer sensors for providing data by which MPU 370 computes or augments GPS phase-tracking estimation of user kinematics. (For some background, see US Patent Application Publication 20120136573 dated May 31, 2012, "Attitude Estimation for Pedestrian Navigation Using Low Cost MEMS Accelerometer in Mobile Applications, and Processing Methods, Apparatus and Systems," Ser. No. 13/301,913 filed Nov. 22, 2011, which is hereby incorporated by reference herein in its entirety.) A PPS pulse-per-second generator 395 is further connected via system bus 360 with MPU 370 and establishes precise one-second intervals.

Turning to assisted GNSS receiver embodiments, any suitable procedure is used to reduce the 2-D search space of FIG. 6 if possible. The external assistance data can include an information message showing the estimated difference in code phase c and Doppler frequency offset between the detected satellite SVi and the remaining satellites SVj. External assistance is provided by a network service, mobile phone network, a wireless network, a combination of a wired and wireless network, and/or an internet service provider. In a coarse time assisted embodiment the receiver 100 is provided with such assistance from a reference point like a cell phone tower or a networked device. The assistance is in the form of receiver position from the reference point, ephemerides data and/or time information. The ephemerides data includes the satellite position information as a function of time. For some background, US Patent Application Publication 20120319899, dated Dec. 20, 2012 "Dynamic Switching to Bit-Synchronous Integration to Improve GPS Signal Detection," Ser. No. 13/161,692 filed Jun. 16, 2011, is hereby incorporated by reference herein in its entirety.

Here, the remarkable structure and process embodiments for sensitivity improvements as described elsewhere herein are combined into a coarse time assisted embodiment that can sensitively detect satellite signals before the bit edge timing is ascertained and then switches to bit synchronized integration upon ascertaining the bit edge timing.

For example, a GSM cell tower provides receiver 100 with ephemerides data suggesting the location of two GPS satellites SV2 and SV1. Suppose satellite SV2 is 20000 km from the GPS receiver (approximately at zenith overhead) and the satellite SV1 is 20000 km-to-25000 km (somewhere lower in the sky) from the receiver at a given time, for example. (Glonass satellites are at somewhat lower-altitude in middle earth orbit and similar remarks apply.) The GSM cell tower also provides information of the receiver 100 current location within, e.g., +/−10 km accuracy from the GSM cell tower. The receiver 100 obtains the distance between the two satellites (e.g., 1000 km) from the assistance data it receives from the GSM cell tower. When the receiver 100 finds the start of the PN code of the satellite SV2, receiver 100 can calculate the approximate start of the PN code of satellite SV1 to be 1000 km+/−10 km divided by the speed of light $c_L$=300,000 km/sec. The receiver 100 electronically estimates the start time of the PN code of lower power satellite SV1 accordingly to be 3.33 ms+/−0.033 ms, i.e. (1000 km+/−10 km)/(300 km/ms). This reduces the hypothesis search and facilitates the acquisition of lower power satellite SV1 and determination of the actual code lag by a less extensive electronically-implemented hypothesis search for GPS in FIG. 7 (and/or FIGS. 6, 7 and 10 as taught herein for Glonass) using the enhanced sensitivity of an embodiment herein. Given the actual code lag, the time position at which each 1 ms PN code starts at SV1 is readily calculated. From there, the 20 ms data bit edge of lower power satellite SV1 is then also calculated or determined based on the time position of the data bit edge of higher power satellite SV2 that is already available. Once the bit edge of satellite SV1 is calculated, even before the maximum available dwell time is consumed, the search is switched from e.g. GPS 19 ms (9 ms Glonass) window search to an e.g. PreD=20 ms bit edge aligned search or synchronous search. The switch to bit synchronized integration mode of operation eliminates the bit edge related loss and even more effectively maintains and holds the satellite acquisition and facilitates the satellite tracking.

Figure 2:
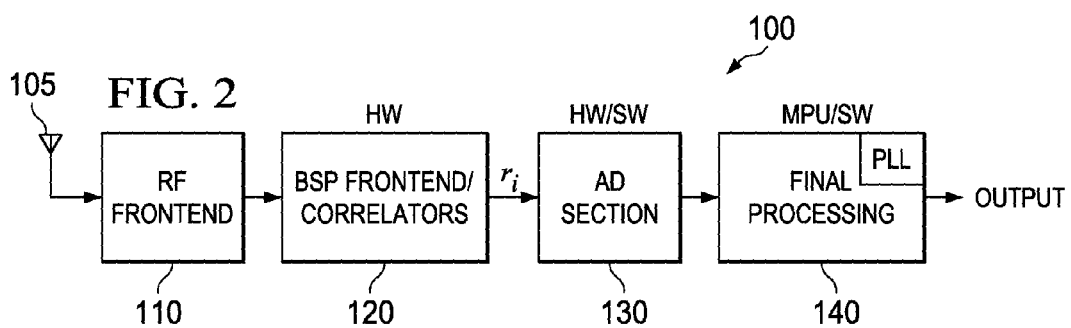
FIG. 2 is a block diagram of an inventive positioning receiver for use in the mobile device of FIG. 1 and improved according to the inventive structures and processes depicted in the other Figures.

Reception of software intercommunication and updating of information such as for assisted operation is provided in some embodiments according to the teachings herein from originating wired or wireless sources and the receiver of FIG. 2, and based for instance on the US Patent Application Publication 20090054075, "Satellite (GPS) Assisted Clock Apparatus, Circuits, Systems and Processes for Cellular Terminals on Asynchronous Networks" dated Feb. 26, 2009, which is hereby incorporated by reference herein in its entirety. Such intercommunication and updating also suitably occur via any other processor in the mobile device with receiver 100 itself such as for GPS positioning, cellular modem, WLAN, Bluetooth, a website, or other circuitry for wireless or wireline modem processor, digital television and physical layer (PHY).

Figure 3B:
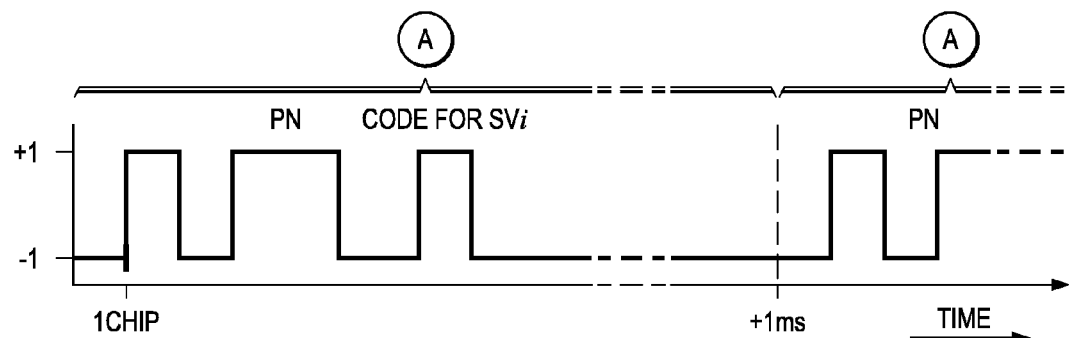
FIG. 3B is a voltage versus time diagram with the time scale magnified relative to that of FIG. 3A showing a repeated pseudorandom noise (PN) sequence.
Figure 3C:
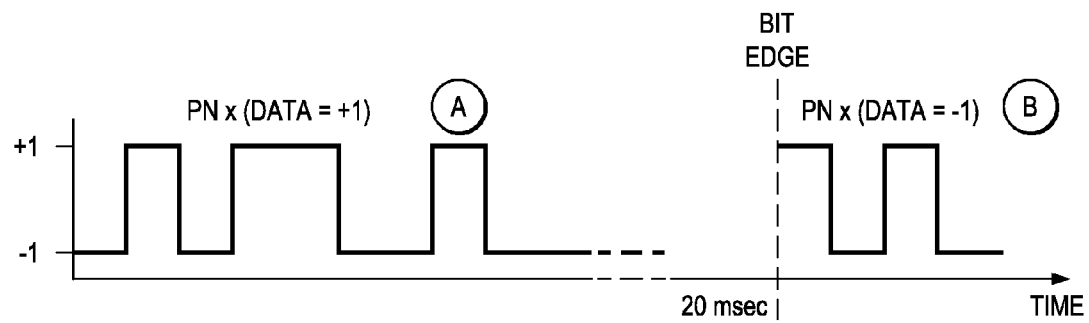
FIG. 3C is a voltage versus time diagram with the time scale same as in FIG. 3B showing binary (+1, −1) data (A), (B) impressed on successive repetitions of the pseudorandom noise (PN) sequence of FIG. 3B.

A general overview of the integration processes over the dwell is as follows. The 1 ms PN code boundary of FIG. 3B is locked in when a peak is found in the FIG. 7 hypothesis search circuit and process. However, assume that identifying which 1 ms boundary is the 20 ms bit boundary of FIG. 3C remains unknown at this point. Coherent integration over, e.g., 19 ms electronically generates a PreD=19 number of addends for respective milliseconds by electronic correlation 120 (310), and those addends are mostly plus terms and perhaps a few minus terms (or vice versa). The terms do not all have the same sign if the SNR is low or if the coherent integration straddles a bit boundary between bits of opposite sign as in FIG. 3C (+1 then −1, or −1 then +1). The coherent integration result is a single number that is the sum of those 19 addends over any given PreD=19 ms window. For non-coherent integration, the square or magnitude of that single number is accumulated each 19 ms and in all PostD times over the dwell to produce a single number in electronic form as the grand total over the dwell resulting from the combined results of coherent integrations that are accumulated by non-coherent integration. Finding a value of code lag and a value of Doppler $f_d$ for which the grand total is maximized is called "finding a peak" herein and in this way a satellite having a given Gold code is acquired by the receiver 100. This peak-finding process is remarkably improved herein for Glonass by a double-frequency category of embodiments as in FIGS. 6 and 10 that provide at least one pair of wipeoff frequencies having a predetermined +/−kFs offset from the Doppler hypothesis frequency as well as PreD=9 ms. Depending on embodiment, the peak-finding process is alternatively or additionally remarkably improved herein for GPS, Glonass or other GNSS by introducing multiple coherent integrations in staggered co-prime PreD windows as in FIG. 13 or 13A.

Then if the signal strength (as indicated by FIG. 14 SV power dBm) of the thus-acquired signal is sufficient, the sign of each individual incoming signal bit can be reliably determined from coherent integration in a given one (or staggered set of) coherent integration PreD window(s) by the sign of the coherent integration result for that PreD window or staggered set. This is because the accumulated product of the Gold code correlated with itself is positive, or the accumulated product of the Gold code correlated with its negation (−1, sign reversal) is negative; and the sign of the signal bit as original modulation determines whether the incoming Gold code from the satellite SVi is negated or not. The sign (+1, −1) of the output of the coherent integration for the PreD window is the receiver 100 demodulated output corresponding to the original modulation in the satellite SVi.

Before the actual 20 ms bit boundary is determined, if at all, by subsequent processing in the receiver or by coarse time-assisted processing, FIGS. 13 and 13A show how multiple staggered co-prime windows are applied to, or used as multiple controls for, some coherent integration process embodiments for GPS/Galileo (FIG. 13) and Glonass (FIG. 13A). Moreover, Glonass reception is further enhanced by the double-frequency category of embodiments of each of FIGS. 6 and 10.

In some embodiments, further channel processing in channel processors 320 determines the actual bit boundary, and the coherent integration can thereafter be executed in exactly a 20 ms window for either GPS/Galileo or Glonass, see FIG. 15. Once the bit boundary is found, then for GPS/Galileo the Gold code and wipeoff from block 210 are applied to the correlator 120 (310) for each 20 ms window of coherent integration involving Gold code for 20 ms and wipeoff is a single frequency $f_d$ on which is impressed the Gold code.

For Glonass, after acquiring a given Glonass satellite, the Gold code and wipeoff from FIG. 7 block 210 are applied in either of two post-acquisition process and structure embodiments as follows.

Post-acquisition Glonass embodiment A: Twenty repetitions of 1 ms Gold code (no negation) are applied per PreD window. Wipeoff is the two frequencies $f_d$+¾Fs, and $f_d$−¾Fs. In each 20 ms bit-window, the twenty instances of 1 ms Gold code are impressed on each of the wipeoff frequencies and correlated with the acquired satellite signal in parallel. For Glonass the sign of the sum of the two correlation results for the 20 ms signal delivers the latest +1 or −1 signal bit.

Post-acquisition Glonass embodiment B: A modified form of FIG. 7 circuit 210 herein issues ten instances of an SV-specific 1 ms Gold code for 10 ms and then issues ten instances of the negation of that 1 ms Gold code for another 10 ms as in FIG. 9 to correlator 120. Wipeoff is a single frequency $f_d$ on which is impressed the Gold code sequence (ten instances of 1 ms plus-code, ten instances of 1 ms minus-code). A total 20 ms of correlating with the acquired satellite signal for Glonass s for the 20 ms signal delivers the latest +1 or −1 signal bit as the sign of the correlation (coherent integration) result.

FIG. 18 illustrates integrated circuit chips including chips 1100, 1200, 1300, 1400, 1500, and GPS 1190 (1495) for use in any one, some or all of the blocks of a communications system. The skilled worker uses and adapts the integrated circuits to the particular parts of the communications system as appropriate to the functions intended. Circuit blocks of the cellular telephone handset of FIG. 18 cooperate, support, or cooperatively utilize GPS or assisted GPS in positioning and location-based applications and are used with or include the positioning receivers of FIGS. 2, 5, 16-17B and the other Figures herein.

For conciseness here, and to the extent not otherwise described herein, the various numerals and description in FIG. 18 parallel the description of the corresponding Figure in said incorporated US Patent Application Publication 20090168843 dated Jul. 2, 2009, "Power-Saving Receiver Circuits, Systems and Processes," which is hereby incorporated by reference herein in its entirety.

In FIG. 18, the receiver hardware has Scan In and Scan Out paths for serial scan testability and verification with a Debugger of FIG. 18. A scan path is coupled to a JTAG 1149.1 or 1149.7 test access port (TAP) controller circuit or otherwise in the system embodiment that supports such testability, and the TAP controller is coupled to the Debugger at test time. Other scannable blocks in any of FIGS. 2, 5, 7, and 16-18 are also included in the scan chain as desired.

A variety of embodiments are provided for spread-spectrum communications systems at base stations, gateways, handsets, and any applicable devices for mobile, portable, and/or fixed use. Such systems suitably support any one or more of global positioning system GPS, Glonass and other location-determining or positioning systems, cellular voice and data, code division multiple access CDMA, wireless local area network WLAN, industrial, scientific, and medical communications, and any other spread-spectrum communications systems. A somewhat overlapping category of embodiments are provided for receivers employing coherent signal accumulation in spread-spectrum or other types of communications systems.

Various embodiments are used with one or more microprocessors, and a microprocessor may have a pipeline such as 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other micro-control blocks using any one or more of the foregoing.

Various embodiments are implemented in any integrated circuit manufacturing process such as different types of MOS, CMOS (complementary metal oxide semiconductor), SOI (silicon on insulator), SiGe (silicon germanium), organic transistors, and with various types of transistors such as single-gate and multiple-gate (MUGFET) field effect transistors, and with single-electron transistors, and other nanoelectronics and other structures. Photonic integrated circuit blocks, components, and interconnects are also suitably applied in various embodiments.

Various embodiments of integrated circuit systems and processes as described herein are manufactured according to a suitable process of manufacturing that prepares RTL (register transfer language) and netlist and/or other integrated design information for a desired embodiment such as one including, or respectively including, a hardware module with one or more integrated circuits, an accumulate and dump receiver and/or spread spectrum receiver with a power save mode controller as described. Such embodiment is verified in simulation electronically on the RTL and netlist. Place and route operations are performed to establish the physical layout of each integrated circuit, and the layout is verified. In this way, the contents and timing of the memory, of the receivers and processor hardware are verified. The operations are verified pertaining to the desired sequences and parallelism of structures herein and other operations of the communications unit and a GNSS unit as described. Verification evaluation determines whether the verification results are currently satisfactory and the verified design of integrated circuit chips with such structures as form an embodiment herein is fabricated in a wafer fab and packaged to produce resulting manufactured integrated circuit(s). First-silicon and production samples are verified such as by using scan chain and tracing methodology on the hardware until the chips are satisfactory. A printed wiring board (PWB) of a system embodiment uses the integrated circuit(s). Software and parameters as described in the various Figures herein are loaded into flash or other nonvolatile memory for the system and verified. The system is powered up and performance is tested and verified on satellite simulations and with actual satellite and/or other reception in the various signal power scenarios.

Aspects (See Explanatory Notes at End of this Section)

13A. The integrated circuit claimed in claim 13 wherein the prior information of the sequence of the data bits results from previous reception.

13B. The integrated circuit claimed in claim 13 wherein the prior information of the sequence of the data bits results from injection of assistance information from an external source.

14A. The receiver claimed in claim 14 wherein said analog receive chain encompasses all of GPS and Glonass at RF and includes a mixer with a local oscillator situated in frequency between them, and followed by an intermediate frequency (IF) section with analog-to-digital conversion encompassing all of GPS and Glonass at IF.

14A1. The receiver claimed in claim 14A wherein said signal processing section is operable to digitally separate GPS and Glonass from each other and to recover data having a data bit period in respective satellite signals from such GPS and Glonass reception.

14B. The integrated circuit claimed in claim 14 wherein the correlation employs at least one pseudorandom code and the staggered windows have a coherent integration window width as short as the length of the pseudorandom code.

14C. The integrated circuit claimed in claim 14 wherein the staggered windows have a coherent integration window width greater than the data bit period.

14C1. The integrated circuit claimed in claim 14C wherein the processor circuit has prior information of a sequence of the data bits spanning the staggered windows and the correlation is processor-responsive to the sequence of the data bits to perform the coherent integration.

22A. The process claimed in claim 22 wherein the plural sample windows are shifted in time by a stagger interval approximately equal to the coherent integration interval divided by the number of windows.

22B. The integrated circuit claimed in claim 22 wherein the correlating employs at least one pseudorandom code having a length and the coherent integration interval is as short as the length of the pseudorandom code.

22C. The integrated circuit claimed in claim 22 wherein the staggered windows have the coherent integration interval greater than the data bit period.

22C1. The integrated circuit claimed in claim 22C further comprising acquiring prior information of a sequence of the data bits spanning the staggered windows and the correlating is responsive to the sequence of the data bits to perform the coherent integration.

25A. The integrated circuit claimed in claim 25 wherein the sensitivity gain of the reception is at least one decibel (1 dB).

A44. A test process to test a receiver operable to determine a Doppler frequency, the process comprising:
supplying as input to a receiver an artificially-generated GNSS signal having a known Doppler frequency and the GNSS signal controllably having and lacking Manchester coding;
operating the receiver to process the GNSS signal as if the Manchester coding were always present and to determine a Doppler frequency;
determining whether the receiver passes the test by establishing that the receiver correctly reports the Doppler frequency on the artificially-generated GNSS signal when having Manchester coding and incorrectly reports the Doppler frequency on the artificially-generated GNSS signal when lacking the Manchester coding.

A44A. The process claimed in claim A44 wherein signal-to-noise ratio SNR of the receiver is diminished when the Manchester coding is artificially lacking.

A45. A test process to test a receiver, the process comprising:
supplying as input to a receiver a synthesized GPS signal free of any data bit transitions and having noise present in each whole data bit period;
injecting a synthesized noisy GPS signal such that in a first case for the first half of such period the noise is the same as the noise in the last half of such period;
measuring the receiver sensitivity;
injecting a synthesized noisy GPS signal such that in a second case for the first half of such period the noise is uncorrelated with the noise in the last half of such period;
monitoring the de-sense in receiver sensitivity between the first case and the second case; and
determining whether the receiver passes the test by establishing that the receiver encounters a less than a predetermined amount of de-sense in its sensitivity in the first case compared to the second case.

A46. A test process comprising:
coupling digital samples from a front end of a receiver under test (RUT) to a properly-performing comparison receiver (CR) with configurable single window or configurably-multiple staggered windows;

adjusting the configured number of windows of the CR to most nearly match the performance of the RUT; and comparing the number of RUT staggered windows configured to be active with the number of CR staggered windows configured to be active;

determining whether the RUT passes or fails by whether the compared numbers are substantially equal or different respectively.

Notes: Aspects are description paragraphs that might be offered as claims in patent prosecution. The above dependently-written Aspects have leading digits and may have internal dependency designations to indicate the claims or aspects to which they pertain. The leading digits and alphanumerics indicate the position in the ordering of claims at which they might be situated if offered as claims in prosecution.

A few preferred embodiments have been described in detail hereinabove. It is to be understood that the scope of the invention comprehends embodiments different from those described, as well as described embodiments, yet within the inventive scope. Microprocessor and microcomputer are synonymous herein. Processing circuitry comprehends digital, analog and mixed signal (digital/analog) integrated circuits, ASIC circuits, PALs, PLAs, decoders, memories, non-software based processors, microcontrollers and other circuitry, and digital computers including microprocessors and microcomputers of any architecture, or combinations thereof. Internal and external couplings and connections can be ohmic, capacitive, inductive, photonic, and direct or indirect via intervening circuits or otherwise as desirable. Implementation is contemplated in discrete components or fully integrated circuits in any materials family and combinations thereof. Various embodiments of the invention employ hardware, software or firmware. Process diagrams and block diagrams herein are representative of flows and/or structures for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in the detailed description and/or the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. An integrated circuit for spread spectrum reception, comprising:
    an hypothesis search circuit operable to search hypothesis frequencies and code lags to produce correlation results; and
    a processor circuit operable to combine the correlation results for at least two hypothesis frequencies at a given code lag, the at least two hypothesis frequencies separated by a predetermined frequency difference, and to identify a peak in the combined correlation results;
    wherein said hypothesis search circuit is operable to switch to a bit edge aligned search to issue a plurality of repetitions of pseudonoise (PN) code free of negation per coherent integration window with a Doppler wipeoff at two frequencies equally offset plus/minus from the Doppler frequency and correlate with a received signal to electronically determine whether the correlation results combined is greater than zero or less than zero, whereby to deliver a latest signal bit.

2. The integrated circuit claimed in claim 1 wherein said processor circuit is further operable to store the code lag of the peak and an inferred Doppler frequency equal to an average of the hypothesis frequencies for the peak.

3. The integrated circuit claimed in claim 1 for reception of a Manchester coded spread spectrum signal having a repetition rate and wherein two of the hypothesis frequencies are offset in frequency from their average plus and minus a predetermined amount approximating the repetition rate.

4. The integrated circuit claimed in claim 1 wherein said hypothesis search circuit includes correlators operating by coherent integration in multiple staggered windows.

5. The integrated circuit claimed in claim 4 wherein the staggered windows are staggered by a time interval.

6. The integrated circuit claimed in claim 1 wherein the at least two hypothesis frequencies are obtained as (f1+kFs) and (f1−kFs), where f1 is a Doppler frequency, Fs is a Manchester code repetition rate and k is a constant.

7. An electronic process for spread spectrum signal processing, comprising:
    electronically searching hypothesis frequencies and code lags to produce correlation results;
    electronically combining the correlation results for at least two hypothesis frequencies at a given code lag, the at least two hypothesis frequencies separated by a predetermined frequency difference, and to identify a peak in the correlation results;
    wherein the searching includes electronically performing an hypothesis search including two coherent integrations in parallel on an hypothesized code lag $c_i$ and using N millisecond windows where N is an integer number and a frequency hypothesis-pair based on hypothesized Doppler $f_d$ plus/minus a predetermined offset based on Fs Manchester code repetition rate.

8. The process claimed in claim 7 further comprising storing the code lag of the peak and an inferred Doppler frequency equal to an average of the hypothesis frequencies.

9. The process claimed in claim 7 wherein said searching includes electronically forming and accumulating an effective multiplication product ABCD including the following factors:
    A) a received signal r(t), and
    B) a Fs=50 Hz square wave for Manchester code repetition, and
    C) Doppler hypothesis waveform values, and
    D) Spectrum de-spreading code with code lag hypothesis c;
and said electronic combining includes a non-coherent accumulation over a dwell.

10. The process claimed in claim 9 wherein to form A×[(B×C)×D] so that an offset pair of Doppler hypotheses is impressed with the de-spreading code, and then correlated with the received signal r(t).

11. The process claimed in claim 9 wherein to form A×[C×(B×D)] so as to issue a series of de-spreading code repetitions and then negations thereof repeatedly, all with code lag hypothesis c, impress same on the Doppler hypothesis, and correlate with the received signal r(t).

12. The process claimed in claim 9 wherein to form (A×C)×(B×D) that includes wipeoff of Doppler from incoming Glonass signal r(t), then correlation of the result with a series of de-spreading code repetitions and then negations thereof repeatedly, all with code lag hypothesis c.

13. The process claimed in claim 7 wherein sensitivity for asynchronous Glonass reception is thereby improved by at least one decibel (1 dB).

* * * * *